(12) United States Patent
Addepalli et al.

(10) Patent No.: US 9,888,363 B2
(45) Date of Patent: Feb. 6, 2018

(54) SYSTEM AND METHOD FOR APPLICATIONS MANAGEMENT IN A NETWORKED VEHICULAR ENVIRONMENT

(71) Applicant: CISCO TECHNOLOGY, INC., San Jose, CA (US)

(72) Inventors: Sateesh K. Addepalli, San Jose, CA (US); Fabio R. Maino, Palo Alto, CA (US); Lillian Lei Dai, Rockville, MD (US); Raghuram S. Sudhaakar, Sunnyvale, CA (US); Chin-Ju Chen, Tustin, CA (US); Erick D. Lee, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 14/619,247

(22) Filed: Feb. 11, 2015

(65) Prior Publication Data

US 2015/0222708 A1 Aug. 6, 2015

Related U.S. Application Data

(62) Division of application No. 13/083,305, filed on Apr. 8, 2011, now Pat. No. 8,989,954.

(Continued)

(51) Int. Cl.
*G06F 15/16* (2006.01)
*H04W 4/04* (2009.01)
(Continued)

(52) U.S. Cl.
CPC ........... *H04W 4/046* (2013.01); *B60R 16/023* (2013.01); *B60W 50/10* (2013.01); *G06F 3/017* (2013.01);
(Continued)

(58) Field of Classification Search
USPC ................. 709/217, 223, 224; 701/1, 23
(Continued)

(56) References Cited

U.S. PATENT DOCUMENTS 5,428,666 A 6/1995 Fyfe et al.
5,604,787 A 2/1997 Kotzin et al.
(Continued)

FOREIGN PATENT DOCUMENTS

DE 10146664 A1 2/2003
EP 1337119 A 8/2003
(Continued)

OTHER PUBLICATIONS

"Cisco Mobile Network Solutions for Public Safety," Cisco.com, 2008 Cisco Systems, Inc., Mar. 2008, 7 pages http://www.cisco.com/en/US/prod/collateral/routers/ps272/prod_white_paper0900aecd806220af.html.
(Continued)

*Primary Examiner* — Andrew Joseph Rudy

(57) ABSTRACT

A method in one example embodiment includes identifying a power state and a battery level of a vehicle. The method also includes allocating power to critical applications (for example) in response to determining that the battery level is above a reserve threshold while the power state of the vehicle is engine-off. The method also includes allocating remaining power in excess of the reserve threshold to non-critical applications according to a power management policy. The power management policy may comprise at least one of a user power preference index and an application power preference index.

20 Claims, 13 Drawing Sheets

Related U.S. Application Data

(60) Provisional application No. 61/433,138, filed on Jan. 14, 2011.

(51) Int. Cl.

| | |
|---|---|
| *H04W 72/04* | (2009.01) |
| *H04W 28/06* | (2009.01) |
| *H04W 52/12* | (2009.01) |
| *G06F 9/54* | (2006.01) |
| *H04W 48/06* | (2009.01) |
| *H04W 48/18* | (2009.01) |
| *B60W 50/10* | (2012.01) |
| *G06F 3/01* | (2006.01) |
| *G06F 3/16* | (2006.01) |
| *H04L 12/26* | (2006.01) |
| *H04L 29/06* | (2006.01) |
| *H04W 12/08* | (2009.01) |
| *G06F 21/45* | (2013.01) |
| *H04W 12/06* | (2009.01) |
| *H04W 28/02* | (2009.01) |
| *H04W 40/20* | (2009.01) |
| *H04W 48/02* | (2009.01) |
| *H04L 29/08* | (2006.01) |
| *B60R 16/023* | (2006.01) |
| *H04L 12/721* | (2013.01) |
| *H04L 29/12* | (2006.01) |
| *H04W 8/06* | (2009.01) |
| *H04W 8/08* | (2009.01) |
| *H04W 8/26* | (2009.01) |
| *H04W 40/02* | (2009.01) |
| *H04L 1/00* | (2006.01) |
| *H04W 4/00* | (2009.01) |
| *H04W 4/10* | (2009.01) |
| *H04W 12/02* | (2009.01) |
| *H04W 12/04* | (2009.01) |
| *H04W 76/00* | (2009.01) |
| *H04W 80/02* | (2009.01) |
| *H04Q 9/00* | (2006.01) |
| *H04L 12/58* | (2006.01) |
| *H04W 84/00* | (2009.01) |
| *H04W 36/08* | (2009.01) |
| *H04W 52/14* | (2009.01) |
| *H04W 52/22* | (2009.01) |
| *H04W 52/24* | (2009.01) |
| *H04W 52/34* | (2009.01) |
| *H04W 84/12* | (2009.01) |
| *H04W 92/18* | (2009.01) |

(52) U.S. Cl.
CPC ............ *G06F 3/167* (2013.01); *G06F 9/542* (2013.01); *G06F 21/45* (2013.01); *H04L 1/008* (2013.01); *H04L 29/06578* (2013.01); *H04L 43/0811* (2013.01); *H04L 43/0858* (2013.01); *H04L 43/0876* (2013.01); *H04L 45/12* (2013.01); *H04L 51/02* (2013.01); *H04L 61/2592* (2013.01); *H04L 63/08* (2013.01); *H04L 63/107* (2013.01); *H04L 67/12* (2013.01); *H04L 67/32* (2013.01); *H04L 69/18* (2013.01); *H04Q 9/00* (2013.01); *H04W 4/00* (2013.01); *H04W 4/10* (2013.01); *H04W 8/06* (2013.01); *H04W 8/08* (2013.01); *H04W 8/26* (2013.01); *H04W 12/02* (2013.01); *H04W 12/04* (2013.01); *H04W 12/06* (2013.01); *H04W 12/08* (2013.01); *H04W 28/0215* (2013.01); *H04W 28/06* (2013.01); *H04W 40/02* (2013.01); *H04W 40/20* (2013.01); *H04W 48/02* (2013.01); *H04W 48/06* (2013.01); *H04W 48/18* (2013.01); *H04W 52/12* (2013.01); *H04W 72/0406* (2013.01); *H04W 72/0493* (2013.01); *H04W 76/005* (2013.01); *H04W 80/02* (2013.01); *H04W 36/08* (2013.01); *H04W 52/143* (2013.01); *H04W 52/225* (2013.01); *H04W 52/241* (2013.01); *H04W 52/346* (2013.01); *H04W 72/042* (2013.01); *H04W 84/005* (2013.01); *H04W 84/12* (2013.01); *H04W 92/18* (2013.01)

(58) Field of Classification Search
IPC ..................... H04L 29/08072, 29/06, 29/08009, 29/080981; G06Q 30/02; B60T 8/172; G05D 1/0272
See application file for complete search history.

(56) References Cited

U.S. PATENT DOCUMENTS

| | | |
|---|---|---|
| 5,737,215 A | 4/1998 | Schricker et al. |
| 5,763,862 A | 6/1998 | Jachimowicz et al. |
| 5,933,773 A | 8/1999 | Barvesten |
| 5,987,325 A | 11/1999 | Tayloe |
| 6,002,929 A | 12/1999 | Bishop et al. |
| 6,078,652 A | 6/2000 | Barak |
| 6,169,387 B1 | 1/2001 | Kaib |
| 6,175,789 B1 | 1/2001 | Beckert et al. |
| 6,285,869 B1 | 9/2001 | Shannon et al. |
| 6,320,351 B1 | 11/2001 | Ng et al. |
| 6,427,072 B1 | 7/2002 | Reichelt |
| 6,427,073 B1 | 7/2002 | Kortesalmi et al. |
| 6,484,082 B1 | 11/2002 | Millsap et al. |
| 6,490,679 B1 | 12/2002 | Tumblin et al. |
| 6,502,131 B1 * | 12/2002 | Vaid ............ H04L 1/1854 709/224 |
| 6,516,357 B1 | 2/2003 | Hamann et al. |
| 6,526,272 B1 | 2/2003 | Bansal et al. |
| 6,542,071 B1 | 4/2003 | Ohtsubo et al. |
| 6,574,734 B1 | 6/2003 | Colson et al. |
| 6,587,127 B1 | 7/2003 | Leeke et al. |
| 6,604,140 B1 | 8/2003 | Beck et al. |
| 6,643,504 B1 | 11/2003 | Chow et al. |
| 6,668,179 B2 | 12/2003 | Jiang |
| 6,714,799 B1 | 3/2004 | Park et al. |
| 6,721,580 B1 | 4/2004 | Moon |
| 6,735,506 B2 | 5/2004 | Breed et al. |
| 6,757,262 B1 | 6/2004 | Weisshaar et al. |
| 6,816,903 B1 * | 11/2004 | Rakoshitz ........... H04L 12/2602 370/230 |
| 6,823,244 B2 | 11/2004 | Breed |
| 6,868,282 B2 | 3/2005 | Carlsson |
| 6,914,517 B2 | 7/2005 | Kinsella |
| 6,925,425 B2 | 8/2005 | Remboski et al. |
| 6,928,299 B1 | 8/2005 | Rinne et al. |
| 6,934,391 B1 | 8/2005 | Linkola et al. |
| 6,957,199 B1 | 10/2005 | Fisher |
| 6,980,830 B2 | 12/2005 | Ahonen |
| 7,039,221 B1 | 5/2006 | Tumey et al. |
| 7,050,897 B2 | 5/2006 | Breed et al. |
| 7,064,711 B2 | 6/2006 | Strickland et al. |
| 7,069,144 B2 | 6/2006 | Yoshihara et al. |
| 7,082,359 B2 | 7/2006 | Breed |
| 7,096,316 B2 | 8/2006 | Karr et al. |
| 7,171,460 B2 | 1/2007 | Kalavade et al. |
| 7,178,724 B2 | 2/2007 | Tamagno et al. |
| 7,185,161 B2 | 2/2007 | Kang |
| 7,218,930 B2 | 5/2007 | Ko et al. |
| 7,222,783 B2 | 5/2007 | Merrien |
| 7,259,469 B2 | 8/2007 | Brummett et al. |
| 7,363,056 B2 | 4/2008 | Faisy |
| 7,389,178 B2 | 6/2008 | Raz et al. |
| 7,412,313 B2 | 8/2008 | Isaac |
| 7,412,380 B1 | 8/2008 | Avendano et al. |

(56) References Cited

U.S. PATENT DOCUMENTS

| | | | |
|---|---|---|---|
| 7,558,110 B2 | 7/2009 | Mizushima et al. | |
| 7,564,842 B2 | 7/2009 | Callaway et al. | |
| 7,593,605 B2 | 9/2009 | King et al. | |
| 7,603,107 B2 | 10/2009 | Ratert et al. | |
| 7,606,643 B2 | 10/2009 | Hunt et al. | |
| 7,630,802 B2 | 12/2009 | Breed | |
| 7,631,033 B2 | 12/2009 | Zehler | |
| 7,636,626 B2 | 12/2009 | Oesterling et al. | |
| 7,676,223 B2 * | 3/2010 | Das | H04B 7/022 370/235 |
| 7,689,231 B2 | 3/2010 | Mardiks et al. | |
| 7,689,251 B2 | 3/2010 | Bae | |
| 7,729,725 B2 | 6/2010 | Stenmark | |
| 7,738,891 B2 | 6/2010 | Tenhunen et al. | |
| 7,755,472 B2 | 7/2010 | Grossman | |
| 7,778,227 B2 | 8/2010 | Gibbs | |
| 7,787,602 B2 | 8/2010 | Pearson et al. | |
| 7,791,310 B2 | 9/2010 | Luz et al. | |
| 7,792,618 B2 | 9/2010 | Quigley et al. | |
| 7,808,375 B2 | 10/2010 | Bertness et al. | |
| 7,844,817 B2 | 11/2010 | Mueller et al. | |
| 7,849,020 B2 | 12/2010 | Johnson | |
| 7,904,569 B1 | 3/2011 | Gelvin et al. | |
| 7,917,251 B2 | 3/2011 | Kressner et al. | |
| 7,957,729 B2 | 6/2011 | Roter et al. | |
| 7,957,744 B2 | 6/2011 | Oesterling et al. | |
| 8,054,038 B2 | 11/2011 | Kelty et al. | |
| 8,060,017 B2 * | 11/2011 | Schlicht | H04L 1/0015 370/338 |
| 8,061,140 B2 | 11/2011 | Harmon | |
| 8,063,797 B1 | 11/2011 | Sonnabend et al. | |
| 8,081,643 B2 | 12/2011 | Sonoda et al. | |
| 8,086,395 B2 | 12/2011 | Mino | |
| 8,095,184 B2 | 1/2012 | Hiltunen et al. | |
| 8,100,206 B2 | 1/2012 | Kressner et al. | |
| 8,131,317 B2 | 3/2012 | Lee | |
| 8,135,443 B2 | 3/2012 | Aleksic et al. | |
| 8,140,064 B2 | 3/2012 | Mardiks | |
| 8,143,741 B2 | 3/2012 | Funakoshi et al. | |
| 8,144,596 B2 | 3/2012 | Veillette | |
| 8,180,400 B2 | 5/2012 | Shin et al. | |
| 8,185,300 B2 | 5/2012 | Miura et al. | |
| 8,195,233 B2 | 6/2012 | Morikuni et al. | |
| 8,195,235 B2 | 6/2012 | Montes | |
| 8,207,642 B2 | 6/2012 | Lafontaine et al. | |
| 8,233,389 B2 | 7/2012 | Yim et al. | |
| 8,244,468 B2 | 8/2012 | Scalisi et al. | |
| 8,244,909 B1 | 8/2012 | Hanson et al. | |
| 8,249,087 B2 | 8/2012 | Takada et al. | |
| 8,255,107 B2 | 8/2012 | Yang et al. | |
| 8,294,420 B2 | 10/2012 | Kocher | |
| 8,296,373 B2 | 10/2012 | Bosworth et al. | |
| 8,335,493 B2 | 12/2012 | Angelhag | |
| 8,364,959 B2 | 1/2013 | Bhanoo et al. | |
| 8,378,623 B2 | 2/2013 | Kusch et al. | |
| 8,514,825 B1 | 8/2013 | Addepalli et al. | |
| 8,582,631 B2 * | 11/2013 | Vos | H04L 25/4906 375/219 |
| 8,602,141 B2 | 12/2013 | Yee et al. | |
| 8,705,527 B1 | 4/2014 | Addepalli et al. | |
| 8,712,474 B2 | 4/2014 | Gehrman | |
| 8,718,797 B1 | 5/2014 | Addepalli et al. | |
| 8,719,431 B2 | 5/2014 | Reif et al. | |
| 8,837,363 B2 | 9/2014 | Jones et al. | |
| 8,848,608 B1 | 9/2014 | Addepalli | |
| 8,863,256 B1 | 10/2014 | Addepalli et al. | |
| 8,903,593 B1 | 12/2014 | Addepalli et al. | |
| 8,964,549 B2 * | 2/2015 | Vos | H04W 28/02 370/232 |
| 8,964,781 B2 * | 2/2015 | Hunzinger | H04B 7/155 370/236 |
| 8,965,677 B2 * | 2/2015 | Breed | B60W 30/04 701/301 |
| 8,989,954 B1 * | 3/2015 | Addepalli | H04W 4/046 370/328 |
| 9,036,509 B1 | 5/2015 | Addepalli et al. | |
| 9,167,618 B2 * | 10/2015 | Brisebois | H04W 76/046 |
| 9,225,782 B2 | 12/2015 | Addepalli et al. | |
| 9,277,370 B2 | 3/2016 | Addepalli et al. | |
| 2001/0033225 A1 | 10/2001 | Razavi et al. | |
| 2002/0006139 A1 | 1/2002 | Kikkawa et al. | |
| 2002/0072388 A1 | 6/2002 | Korneluk et al. | |
| 2002/0097855 A1 | 7/2002 | Neudeck et al. | |
| 2002/0103964 A1 | 8/2002 | Igari | |
| 2002/0165008 A1 | 11/2002 | Sashimara et al. | |
| 2002/0174360 A1 | 11/2002 | Ikeda | |
| 2002/0198632 A1 | 12/2002 | Breed et al. | |
| 2003/0005435 A1 | 1/2003 | Nelger et al. | |
| 2003/0009271 A1 | 1/2003 | Akiyama | |
| 2003/0028763 A1 | 2/2003 | Malinen et al. | |
| 2003/0033435 A1 | 2/2003 | Hanner | |
| 2003/0046228 A1 | 3/2003 | Berney | |
| 2003/0051041 A1 | 3/2003 | Kalavade et al. | |
| 2003/0083968 A1 | 5/2003 | Marsh et al. | |
| 2003/0152038 A1 | 8/2003 | Oshima et al. | |
| 2003/0191939 A1 | 10/2003 | Tsai et al. | |
| 2004/0008677 A1 | 1/2004 | Cen | |
| 2004/0022216 A1 | 2/2004 | Shi | |
| 2004/0023689 A1 | 2/2004 | Ahonen | |
| 2004/0024670 A1 | 2/2004 | Valenzuela et al. | |
| 2004/0042604 A1 | 3/2004 | Hiltunen et al. | |
| 2004/0073339 A1 | 4/2004 | Ruoppolo | |
| 2004/0083043 A1 | 4/2004 | Akiyama et al. | |
| 2004/0087305 A1 | 5/2004 | Jiang et al. | |
| 2004/0137890 A1 | 7/2004 | Kalke | |
| 2004/0143386 A1 | 7/2004 | Yoshihara et al. | |
| 2004/0162653 A1 | 8/2004 | Ban et al. | |
| 2004/0165656 A1 | 8/2004 | Shiue et al. | |
| 2004/0171386 A1 | 9/2004 | Mitjana | |
| 2004/0204087 A1 | 10/2004 | Carlsson | |
| 2004/0229601 A1 | 11/2004 | Zabawskyj et al. | |
| 2004/0230345 A1 | 11/2004 | Tzamaloukas | |
| 2004/0246966 A1 | 12/2004 | Wu et al. | |
| 2004/0249915 A1 | 12/2004 | Russell | |
| 2004/0256451 A1 | 12/2004 | Goman et al. | |
| 2005/0009563 A1 | 1/2005 | Stenmark | |
| 2005/0018883 A1 | 1/2005 | Scott | |
| 2005/0020250 A1 | 1/2005 | Chaddha et al. | |
| 2005/0039027 A1 | 2/2005 | Shapiro | |
| 2005/0041660 A1 | 2/2005 | Pennec et al. | |
| 2005/0060070 A1 | 3/2005 | Kapolka et al. | |
| 2005/0065678 A1 | 3/2005 | Smith et al. | |
| 2005/0075137 A1 | 4/2005 | Reemtsma | |
| 2005/0096836 A1 | 5/2005 | Minami et al. | |
| 2005/0101323 A1 | 5/2005 | De Beer | |
| 2005/0124288 A1 | 6/2005 | Karmi et al. | |
| 2005/0131673 A1 | 6/2005 | Koizumi et al. | |
| 2005/0162687 A1 | 7/2005 | Lee | |
| 2005/0207408 A1 | 9/2005 | Elliott | |
| 2005/0239504 A1 | 10/2005 | Ishi et al. | |
| 2005/0266883 A1 | 12/2005 | Chatrath | |
| 2005/0271037 A1 | 12/2005 | Habaguchi et al. | |
| 2005/0282554 A1 | 12/2005 | Shyy et al. | |
| 2006/0020783 A1 | 1/2006 | Fisher | |
| 2006/0031590 A1 | 2/2006 | Monette et al. | |
| 2006/0059340 A1 | 3/2006 | Eldenmalm et al. | |
| 2006/0068786 A1 | 3/2006 | Florence | |
| 2006/0075242 A1 | 4/2006 | Aissi et al. | |
| 2006/0076420 A1 | 4/2006 | Prevost et al. | |
| 2006/0079237 A1 | 4/2006 | Liu et al. | |
| 2006/0079254 A1 | 4/2006 | Hogan | |
| 2006/0089157 A1 | 4/2006 | Casey | |
| 2006/0129311 A1 | 6/2006 | Bauman et al. | |
| 2006/0129848 A1 | 6/2006 | Paksoy et al. | |
| 2006/0160532 A1 | 7/2006 | Buckley et al. | |
| 2006/0172772 A1 | 8/2006 | Bjorkner | |
| 2006/0181521 A1 | 8/2006 | Perreault et al. | |
| 2006/0183500 A1 | 8/2006 | Choi | |
| 2006/0218337 A1 | 9/2006 | Hashimoto | |
| 2006/0224887 A1 | 10/2006 | Vesikivi et al. | |
| 2006/0234693 A1 | 10/2006 | Isidore et al. | |
| 2006/0277589 A1 | 12/2006 | Margis et al. | |

(56) References Cited

U.S. PATENT DOCUMENTS

| | | |
|---|---|---|
| 2006/0282554 A1 | 12/2006 | Jiang et al. |
| 2006/0285538 A1 | 12/2006 | Oommen |
| 2006/0291455 A1 | 12/2006 | Katz et al. |
| 2007/0004457 A1 | 1/2007 | Han |
| 2007/0021847 A1 | 1/2007 | Hyodo et al. |
| 2007/0027583 A1 | 2/2007 | Tamir et al. |
| 2007/0030119 A1 | 2/2007 | Ono et al. |
| 2007/0030136 A1 | 2/2007 | Teshima et al. |
| 2007/0038772 A1 | 2/2007 | Obata |
| 2007/0060200 A1 | 3/2007 | Boris et al. |
| 2007/0067085 A1 | 3/2007 | Lu et al. |
| 2007/0077966 A1 | 4/2007 | Huang |
| 2007/0094337 A1 | 4/2007 | Klassen et al. |
| 2007/0105531 A1 | 5/2007 | Schroeder, Jr. |
| 2007/0124490 A1 | 5/2007 | Kalavade et al. |
| 2007/0129072 A1 | 6/2007 | Yamato et al. |
| 2007/0130156 A1 | 6/2007 | Tenhunen et al. |
| 2007/0139216 A1 | 6/2007 | Breed |
| 2007/0149170 A1 | 6/2007 | Bloebaum et al. |
| 2007/0167161 A1 | 7/2007 | Cheng et al. |
| 2007/0177562 A1 | 8/2007 | Castrogiovanni et al. |
| 2007/0198144 A1 | 8/2007 | Norris et al. |
| 2007/0202895 A1 | 8/2007 | Benco et al. |
| 2007/0218947 A1 | 9/2007 | Buckley |
| 2007/0223031 A1 | 9/2007 | Kitada et al. |
| 2007/0225873 A1 | 9/2007 | Toya et al. |
| 2007/0238449 A1 | 10/2007 | Park et al. |
| 2007/0254713 A1 | 11/2007 | Lagnado et al. |
| 2007/0255797 A1 | 11/2007 | Dunn et al. |
| 2007/0265735 A1 | 11/2007 | Chigusa |
| 2007/0266428 A1 | 11/2007 | Downes et al. |
| 2007/0271014 A1 | 11/2007 | Breed |
| 2007/0273492 A1 | 11/2007 | Hara et al. |
| 2008/0020755 A1 | 1/2008 | Liu et al. |
| 2008/0020773 A1 | 1/2008 | Black et al. |
| 2008/0027606 A1 | 1/2008 | Helm |
| 2008/0028230 A1 | 1/2008 | Shatford |
| 2008/0031207 A1 | 2/2008 | Martinez et al. |
| 2008/0040005 A1 | 2/2008 | Breed |
| 2008/0043759 A1 | 2/2008 | Poetker et al. |
| 2008/0051062 A1 | 2/2008 | Lee |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0122597 A1 | 5/2008 | Englander |
| 2008/0147265 A1 | 6/2008 | Breed |
| 2008/0147271 A1 | 6/2008 | Breed |
| 2008/0169350 A1 | 7/2008 | Audebert et al. |
| 2008/0205416 A1 | 8/2008 | DeChiara |
| 2008/0209545 A1 | 8/2008 | Asano |
| 2008/0220743 A1 | 9/2008 | Mora et al. |
| 2008/0226074 A1 | 9/2008 | Sammour et al. |
| 2008/0227604 A1 | 9/2008 | Daniel |
| 2008/0238135 A1 | 10/2008 | Takeda et al. |
| 2008/0254766 A1 | 10/2008 | Craven |
| 2008/0261561 A1 | 10/2008 | Gehrmann |
| 2008/0265024 A1 | 10/2008 | Tracy et al. |
| 2008/0267186 A1 | 10/2008 | Boukis |
| 2008/0284575 A1 | 11/2008 | Breed |
| 2008/0289018 A1 | 11/2008 | Kawaguchi |
| 2008/0290161 A1 | 11/2008 | Blake |
| 2008/0311912 A1 | 12/2008 | Balasubramanian et al. |
| 2009/0003283 A1 | 1/2009 | Meylan |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0043441 A1 | 2/2009 | Breed |
| 2009/0061839 A1 | 3/2009 | Zimmerman et al. |
| 2009/0077643 A1 | 3/2009 | Schmidt et al. |
| 2009/0138136 A1 | 5/2009 | Natsume |
| 2009/0154460 A1 | 6/2009 | Varela et al. |
| 2009/0163175 A1 | 6/2009 | Shi et al. |
| 2009/0215449 A1 | 8/2009 | Avner |
| 2009/0225736 A1 | 9/2009 | Patarkazishvili |
| 2009/0227230 A1 | 9/2009 | Camilleri et al. |
| 2009/0265633 A1 | 10/2009 | Lim et al. |
| 2009/0312850 A1 | 12/2009 | Higuchi et al. |
| 2010/0005313 A1 | 1/2010 | Dai |
| 2010/0037057 A1 | 2/2010 | Shim et al. |
| 2010/0049626 A1 | 2/2010 | Hong |
| 2010/0070171 A1 | 3/2010 | Barbeau et al. |
| 2010/0085868 A1 | 4/2010 | Guo et al. |
| 2010/0088401 A1 | 4/2010 | DeGraeve et al. |
| 2010/0112997 A1 | 5/2010 | Roundtree |
| 2010/0167702 A1 | 7/2010 | Madhavan |
| 2010/0167721 A1 | 7/2010 | Madhavan |
| 2010/0167724 A1 | 7/2010 | Haran et al. |
| 2010/0183016 A1 | 7/2010 | Bonk et al. |
| 2010/0195724 A1 | 8/2010 | Yoshida et al. |
| 2010/0202346 A1 | 8/2010 | Sitzes et al. |
| 2010/0208698 A1 | 8/2010 | Lu |
| 2010/0215043 A1 | 8/2010 | Hisada |
| 2010/0226291 A1 | 9/2010 | Gorbachov |
| 2010/0232404 A1 | 9/2010 | Chen et al. |
| 2010/0234009 A1 | 9/2010 | Antani et al. |
| 2010/0234071 A1 | 9/2010 | Shabtay et al. |
| 2010/0248690 A1 | 9/2010 | Biggs et al. |
| 2010/0279653 A1 | 11/2010 | Poltorak |
| 2010/0280956 A1 | 11/2010 | Chutorash et al. |
| 2010/0291924 A1 | 11/2010 | Antrim et al. |
| 2010/0294750 A1 | 11/2010 | Hogenmueller et al. |
| 2010/0311391 A1 | 12/2010 | Siu et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2011/0032952 A1 | 2/2011 | Rochon et al. |
| 2011/0034201 A1 | 2/2011 | Hamada et al. |
| 2011/0055292 A1 | 3/2011 | Madau et al. |
| 2011/0059738 A1 | 3/2011 | Waller |
| 2011/0071718 A1 | 3/2011 | Norris et al. |
| 2011/0106375 A1 | 5/2011 | Sundaram |
| 2011/0149982 A1 | 6/2011 | Hwang et al. |
| 2011/0153149 A1 | 6/2011 | Jeon et al. |
| 2012/0004933 A1 | 1/2012 | Foladare et al. |
| 2012/0089299 A1 | 4/2012 | Breed |
| 2012/0109418 A1 | 5/2012 | Lorber |
| 2012/0109446 A1 | 5/2012 | Yousefi et al. |
| 2012/0182935 A1 | 7/2012 | Addepalli et al. |
| 2013/0018575 A1 | 1/2013 | Birken et al. |
| 2013/0159466 A1 | 6/2013 | Mao |
| 2013/0301584 A1 | 11/2013 | Addepalli et al. |
| 2014/0049413 A1 | 2/2014 | Agarwal et al. |
| 2014/0303801 A1 | 10/2014 | Addepalli et al. |
| 2014/0380442 A1 | 12/2014 | Addepalli et al. |
| 2015/0029987 A1 | 1/2015 | Addepalli et al. |
| 2015/0222708 A1 | 8/2015 | Addepalli et al. |

FOREIGN PATENT DOCUMENTS

| | | |
|---|---|---|
| EP | 1696357 A1 | 8/2006 |
| EP | 1727383 A1 | 11/2006 |
| EP | 1737160 | 12/2006 |
| EP | 1758335 | 2/2007 |
| GB | 2294787 | 5/1996 |
| GB | 2313257 A | 11/1997 |
| GB | 2386803 A | 9/2003 |
| GB | 2406925 | 4/2005 |
| JP | 2000194660 | 7/2000 |
| WO | WO 92/19078 | 10/1992 |
| WO | WO 99/24938 | 5/1999 |
| WO | WO 99/27730 | 6/1999 |
| WO | WO 99/46682 | 9/1999 |
| WO | WO 00/79368 | 12/2000 |
| WO | WO 0111577 | 2/2001 |
| WO | WO 02/067563 | 8/2002 |
| WO | WO 02/089449 | 11/2002 |
| WO | WO 03/007639 | 1/2003 |
| WO | WO 2004/021296 | 3/2004 |
| WO | WO 2005/029890 | 3/2005 |
| WO | WO 2006/094564 | 9/2006 |
| WO | WO 2007/143342 | 12/2007 |
| WO | WO 2008/040964 | 4/2008 |
| WO | WO 2009/082759 | 7/2009 |

(56) References Cited

FOREIGN PATENT DOCUMENTS

OTHER PUBLICATIONS

"TCG Mobile Trusted Module Specification." Trusted Computing Group, Specification version 1.0, Revision 6, Jun. 2008, 105 pages; [Retrieved and printed Apr. 8, 2011] http://www.trustedcomputing-group.org/files/resource_files/87852F33-1D09-3519-AD0C0F141CC6B10D/Revision_6-tcg-mobile-trusted-module-1_0.pdf.
Alves, T., et al., "TrustZone: Integrated Hardware and Software Security," Information Quarterly, vol. 3, No. 4, 2004, pp. 18-24; [Retrieved and printed Apr. 8, 2011] http://www.iqmagazineonline.com/magazine/pdf/v_3_4_pdf/Pg18_24_custZone_Secur.pdf.
Arsenault, A., et al., "Securely Available Credentials—Requirements," IETF, Network Working Group, RFC 3157, Baltimore Technologies, Aug. 2001, 20 pages.
Autonet Mobile, "Autonet Mobile Features, Technology Specifications," autonetmobile.com, 1 page; [earliest known publication date: Apr. 8, 2011]. http://www.autonetmobile.com/service/anmdev.html.
Autonet Mobile, "CARFI Features, Technology Specifications," autonetmobile.com, 1 page; [earliest known publication date: Apr. 8, 2011] http://autonetmobile.com/service/carfidev.html.
Autonet Mobile, "It's What Your Car has been Waiting for," autonetmobile.com, 2 pages; [retrieved and printed Apr. 8, 2011] http://www.autonetmobile.com/service/.
Bickhart, Ryan W., et al., "Transparent TCP-to-SCTP Translation Shim Layer," EuroBSDCon 2007, Copenhagen, Denmark, Sep. 17-18, 2007; 14 pages.
Bilstrup, "A Survey Regarding Wireless Communication Standards Intended for a High-Speed Vehicle Environment," Technical Report IDE0712, Feb. 2007, 51 pages.
Blazevic, Ljubica, et al., "A Location-Based Routing Method for Mobile Ad Hoc Networks," IEEE Transactions on Mobile Computing, vol. 4, No. 2, Mar./Apr. 2005 (Issue publication date: (Feb. 7, 2005); 14 pages.
Boman, K., Niemi, V., et al. "UMTS Security," Electronics and Communication Engineerying Journal, Oct. 2002, 14 pages; http://www.it.iitb.ac.in/~kavita/GSM_Security_Papers/New%20papers/umts_security.pdf.
Dierks, T., et al., "The Transport Layer Security (TLS) Protocol," (Version 1.1), Network Working Group, RFC 4346, Apr. 2006, 87 pages; http://www.rfc-editor.org/rfc/pdfrfc/rfc4346.txt.pdf.
EPO May 22, 2012 European Search Report and Written Opinion from EP 12150208.2.
Farinacci, D. et al., "LISP Mobile Node," Network Working Group Internet Draft, Feb. 1, 2010, 22 pages; http://tools.ietf.org/id/draft-meyer-lisp-mn-01.txt.
Harkins, D., et al., "The Internet Key Exchange (IKE)," Network Working Group, RFC 2409, Nov. 1998, 41 pages; http://www.rfc-editor.org/rfc/pdfrfc/rfc2409.txt.pdf.
Hsu, WAVE/DSRC Development and Standardization, Industrial Technology Research Institute, Oct. 1, 2010, 84 pages.
Ibars, Christian et al., "Radio Resource Allocation for a High Capacity Vehicular Access Network," 4th International Symposium on Wireless Vehicular Communications: WIVEC2011, Sep. 5-6, 2011, San Francisco, CA; U.S., 5 pages, http://www.ieeevtc.org/wivec2011/.
Ibars, Christian et al., "Wireless Services in the Connected Vehicle Era," IEEE Communications Magazine, Dec. 23, 2010, 13 pages.
Kent, S., et al., "Security Architecture for the Internet Protocol," Network Working Group, RFC 2401, Nov. 1998, 66 pages; http://www.rfc-editor.org/rfc/pdfrfc/rfc2401.txt.pdf.
Lillian Lei Dai, "*Proactive Mobile Wireless Networks: an infrastructureless wireless network architecture for delay-sensitive applications,*" Massachusetts Institute of Technology, Jun. 2008 (two parts submitted: Part 1 —105 pages; Part 2—97 pages).
PCT Apr. 22, 2009 International Search Report for PCT/US08/88320; 3 pages.
PCT Jun. 29, 2010 International Preliminary Report on Patentability and Written Opinion of the International Searching Authority for PCT/US08/88320; 10 pages.
Robert Bosch GmbH, *Automotive Electrics Automotive Electronics, Systems and Components, New: Networking Hybrid Drive,* $5^{th}$ Edition, Nov. 2007, BentleyPublishers.com, 255 pages (two parts submitted: Part 1—121 pages; Part 2—131 pages) [Best copy available—Library of Congress Catalog Record included].
Scarfone, Karen et al., "Guide to Instrusion Detection and Prevention Systems (IDPS)," NIST (National Institute of Standards and Technology), Special Publication 800-94, Feb. 2007, 127 pages http://csrc.ncsl.nist.gov/publications/nistpubs/800-94/SP800-94.pdf.
Shevade, Updendra et al., "Enabling High-Bandwidth Vehicular Content Distribution," ACM CoNEXT 2010, Philadelphia, PA, Nov. 2010, 12 pages http://www.cs.utexas.edu/~lili/papers/pub/conext10.pdf.
Weigle, Dr. Michele, "Standards: WAVE/DSCRC/802.11p, CS 795/895 Vehicular Networks," Old Dominion University, Spring 2008, 19 pages.
Zeldovich, Nickalai et al., "Making Information Flow Explicit in HiStar," OSDI '06: $7^{th}$ USENIX Symposium on Operating Systems Design and Implementation, Nov. 2006, 16 pages.
Zeldovich, Nickolai et al., "Securing Distributed Systems with Information Flow Control," NSDI '08: $5^{th}$ USENIX Symposium on Networked Systems Design and Implementation, Apr. 2008, 16 pages.
Freeman, Shanna, "How OnStar Works," HowStuffWorks.com, a Discovery Company; Feb. 8, 2006 http://auto.howstuffworks.com/onstar2.htm/printable.
Wahab, et al.,"Driving Profile Modeling and Recognition Based on Soft Computer Approach," IEEE Transactions on Neural Networks, vol. 20, No. 4, Apr. 2009.
Petrescu, et al., "Joint IP Networking and Radio Architecture for Vehicular Networks," 11th International Conference on ITS Telecommunications, Aug. 2011, St. Petersburg, Germany; 7 pages.

\* cited by examiner

SYSTEM AND METHOD FOR APPLICATIONS MANAGEMENT IN A NETWORKED VEHICULAR ENVIRONMENT

CROSS-REFERENCE TO RELATED APPLICATION

This application is a divisional (and claims the benefit under 35 U.S.C. § 120) of U.S. application Ser. No. 13/083, 305, filed Apr. 8, 2011, entitled "SYSTEM AND METHOD FOR APPLICATIONS MANAGEMENT IN A NETWORKED VEHICULAR ENVIRONMENT," Inventors Sateesh K. Addepalli, et al., which application claims the benefit of priority under 35 U.S.C. § 119(e) of U.S. Provisional Application Ser. No. 61/433,138, filed Jan. 14, 2011, entitled "SYSTEM, METHOD, AND PROCESSES ASSOCIATED WITH CONNECTED VEHICLES," by inventors Sateesh K. Addepalli, et al. The disclosures of both of the prior applications are considered part of (and are incorporated by reference in) the disclosure of this application in their entireties.

TECHNICAL FIELD

This disclosure relates in general to the field of applications management and, more particularly, to managing power and communications applications in a vehicular environment.

BACKGROUND

Networking architectures have grown increasingly complex, where their underlying architectures have been designed for use in a wide variety of communications environments. Demand continues to rise among the subscriber base of end users for reliable network access across network environments. In particular, configuring suitable network architecture for vehicular environments (e.g., automobiles, airplanes, trains, boats, etc.) presents unique difficulties. For example, vehicles can be found across a large geographic area and may need to communicate with both fixed and roaming external nodes, as well as communicate with intra-vehicle devices over internal networks. Furthermore, communications may be hampered by intentional and/or incidental interferences, cost factors, as well as power-related limitations. Thus, providing the ability for vehicles to communicate in vehicular network environments in a reliable, cost-effective, and power-conscious manner presents significant challenges to system designers, automobile manufacturers, service providers, and the like.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example embodiment includes identifying a power state and a battery level of a vehicle. The method also includes allocating power to critical applications (for example) in response to determining that the battery level is above a reserve threshold while the power state of the vehicle is engine-off. The method also includes allocating remaining power in excess of the reserve threshold to non-critical applications according to a power management policy. The power management policy may comprise at least one of a user power preference index and an application power preference index.

A method in another example embodiment includes identifying at least one type of data, an urgency of the data, a destination of the data, and a set of available communications channels to form an identified data in response to detecting a request to transmit data. The method also includes sending the identified data using a transmission policy. The transmission policy may include sending data traffic using communications channels and sending control traffic using the communications channels. The control traffic may include topology maintenance data and acknowledgment data.

A method in another example embodiment includes receiving data (for example, in real time) from a sensor associated with a data network in the vehicle. The method also includes comparing the data to a behavior model. Additionally, the method includes determining whether a deviation exists above a threshold within the data from the behavior model.

Example Embodiments

Figure 1:
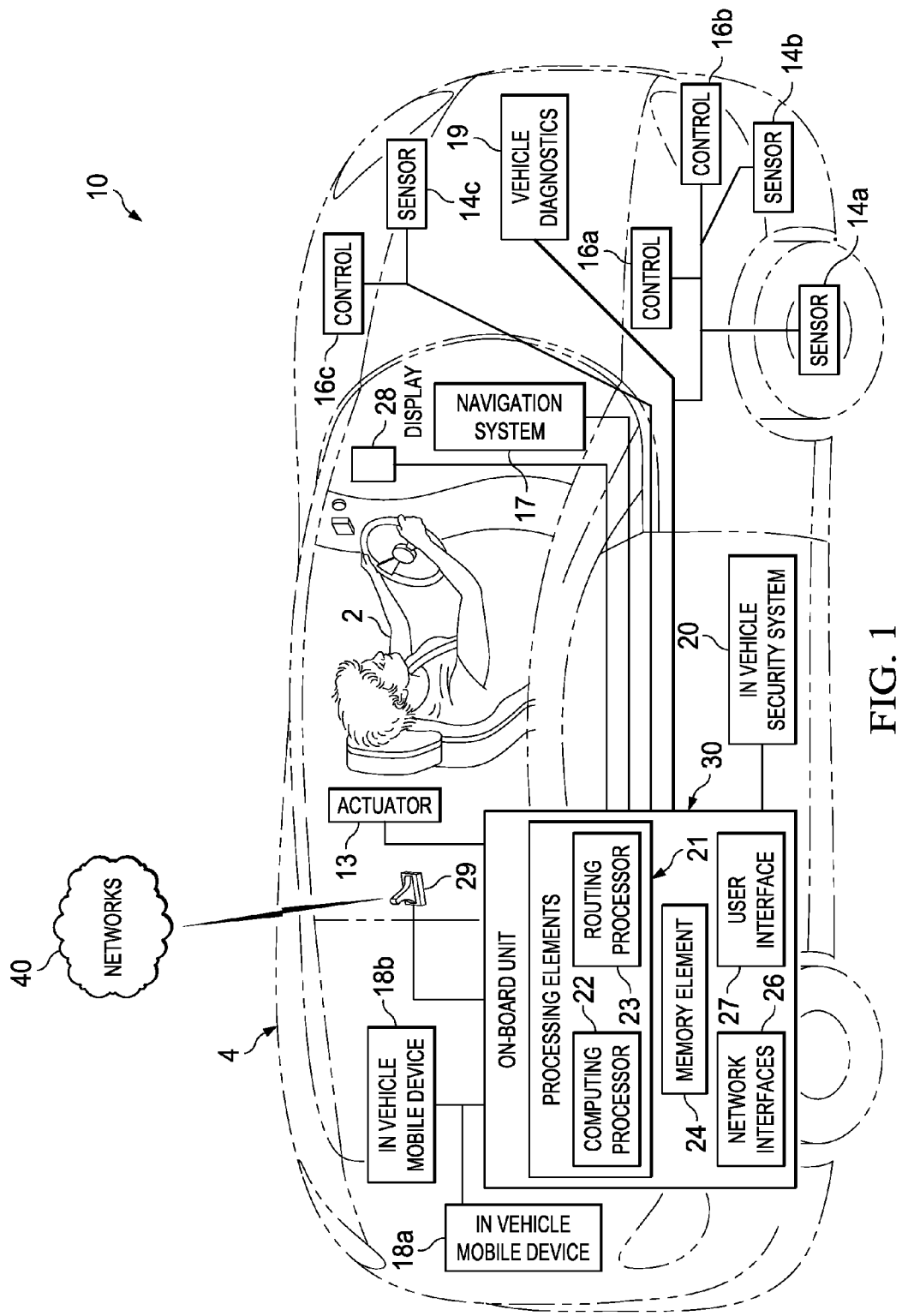
FIG. 1 is a simplified schematic diagram of a communication system for implementing applications management in accordance with embodiments of the present disclosure.

Turning to FIG. 1, FIG. 1 is a simplified block diagram of a communication system 10 for applications management in a vehicular environment. The example architecture of FIG. 1 includes an end user (driver) 2 operating a vehicle 4 that includes an on-board unit (OBU) 30. In this particular example, OBU 30 includes processing elements 21, which include a computing processor 22 and a routing processor 23. OBU 30 also includes a memory element 24, network interfaces 26, a user interface 27, and a display 28. OBU 30 can be suitably coupled to a plurality of sensors 14a-c, a plurality of controls (e.g., electronic control units (ECUs)) 16a-c, and a plurality of actuators, such as actuator 13. In one example embodiment, sensors 14a-b and controls 16a-b may be part of an automotive diagnostic system, indicated by vehicle diagnostics 19, which may also be suitably integrated with OBU 30. OBU 30 may also be suitably coupled to various in-vehicle mobile devices 18a-b at any given time. OBU 30 may also include capabilities associated with navigation system 17 (e.g., a global positioning system (GPS)) and in-vehicle security system 20 (e.g., OnStar). FIG. 1 also includes networks 40, representing various types of connectivity to vehicle 4 (e.g., via antenna 29). Each established network of networks 40 has a logical coupling to remote network nodes or other external electronic devices.

Elements of FIG. 1 may be coupled to one another through one or more interfaces (e.g., network interfaces 26) employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs. In addition, communication system 10 may also include a configuration capable of accommodating legacy bus subsystems that may be employed to convey information across the myriad of machine devices (e.g., sensors 14a-c, controls 16a-c, actuator 13) in vehicle 4.

As used herein, the term 'machine device' is meant to encompass sensors, actuators, electronic control units (ECUs) or controls, instruments, embedded devices, media devices, infotainment systems, vehicle navigation systems, displays, other peripheral or auxiliary devices or components, etc. Machine devices may be physically distributed across the vehicle in a vehicle subsystem, consolidated in any way, provisioned in proprietary configurations, or otherwise configured based on particular networking, vehicle, and/or end user needs.

Embodiments of communication system 10 can facilitate power management by using optimized power management policies that take into account real-time data originating from intra and extra-vehicular sources. Given the evolution of increasingly complex and power-hungry electrical systems, and the projected proliferation of electric vehicles, there is a need for intelligent power management to ensure that critical applications are operational. Accordingly, it is important to have a unified, optimized, and integrated framework to fulfill all aspects of power management, including but not limited to, charging, billing, and power conservation.

Additionally, embodiments of communications system 10 can manage communications by identifying characteristics of data, differentiating the various wireless interfaces to networks 40 based upon relative strengths and weaknesses, and sending the data through selected communications channels. Given the plethora of communications originating from within a vehicle for delivery to various internal and external nodes over various communications channels, and the increasing likelihood of purposeful or incidental communications interference, there is a need for a reliable and cost-effective communications solution utilizing the existing infrastructure of networks 40.

For purposes of illustrating the operational aspects of communication system 10, it is important to first understand the activities and problems that may be present in operational scenarios transpiring in a vehicular environment such as the one shown in FIG. 1. The following information may be viewed as a basis from which the present disclosure may be properly explained. Such information is offered for purposes of explanation only and, accordingly, should not be construed in any way to limit the broad scope of the present disclosure and its potential applications.

Many useful, but disparate, networks may exist in today's vehicles. For example, a geographical positioning system (GPS), personal mobile devices (e.g., mobile phones, smart mobile phones/devices, e-book readers, tablets, laptops/net books, portable navigation systems, multimedia devices, etc.), and internal bus subsystems (e.g., CAN bus, LIN bus, Flexray, MOST, etc.), facilitate the coexistence of some of the many possible networks within a single vehicle such as a personal automobile.

Vehicles employ a number of different bus subsystems to convey information across the myriad of sensors and actuators that are disseminated throughout a vehicle. A CAN bus is a vehicle bus standard designed to allow microcontrollers, sensors, and other devices associated with a vehicle to communicate with each other within the vehicle (e.g., without a host computer). CAN is a message based protocol, designed for and typically used by automotive applications, such as, for example, soft real-time control of devices such as the antilock breaking system. With appropriate network access, the CAN bus can be used to provide real-time vehicle diagnostics from associated sensors and controls.

LIN (Local Interconnect Network) is used to sense external conditions (light) or to control small mechanisms such as door-locking systems. Flexray is used for hard real-time controllers used for drive-by-wire applications. MOST (Media Oriented System Transport) is used for transmitting audio, video, and voice on fiber optics. The need for exchange of data between these different bus subsystems can rely on the presence of gateways, deployed across two different bus subsystems, or supergateways deployed across multiple subsystems.

A separate network in the vehicle may exist for IP devices involved in the vehicle navigation system (e.g., GPS) and, possibly, another network associated with simple content delivery. Other networks could be used for Internet access for end users through, for example, mobile devices. Hence, various levels of network usage and different purposes of network usage may be present. Network usage in each of the identified cases may have a different usage scope, different latency, different bandwidth, different associated routing, different policy requirements, and the like.

For data transmission, the evolution of vehicular networking has focused on enabling vehicle-to-vehicle communication that supports single and multihop scenarios. High vehicle mobility creates dynamic network environments as the topology and connectivity between vehicles continually changes. Despite many proposals and research publications on topology maintenance, routing and delay tolerance mechanisms, practical and deployable solutions are inadequate. Given the unreliable nature of most existing multihop vehicular networks, even demand for such applications has thus far been confined to military and emergency response as well as in developing regions where there is minimal or no wireless infrastructure at all.

From a pragmatic perspective, it is unlikely that commercial vehicular network routers will only have a single radio for vehicle-to-vehicle communication. Rather, there will likely be multiple wireless interfaces, some for direct access between vehicle and road-side infrastructure (e.g. Femtocell, WiMax, WiFi, 3G, 4G, white space, 802.11x, satellite, Bluetooth, Near field communication, LTE, GSM/WCDMA/HSPA, CDMA1x/EVDO, DSRC, CAN, GPS, and traffic lights and ramp posts equipped with communication devices that may be rugged, etc.) and some for vehicle-to-vehicle communication. Initially, when few vehicles on the road will have communication capabilities, those that do will likely access available infrastructure such as 3G, 4G, and WiFi networks. As the penetration rate of vehicles equipped with communication devices increases in the future, multihop vehicular networking may become important.

First, multihop vehicular networking could help reduce network access costs. While 3G and 4G networks are largely pervasive in areas of high population density, the service providers are increasingly moving towards a tiered pricing model for data consumption where users are charged higher fees when data usage exceeds predetermined thresholds. This tiered pricing model is a reactionary measure in response to recent surges in data traffic volume and will have significant impacts on the deployment and utilization of free wireless services (primarily a significant increase in WiFi access points and possibly a revival of municipal WiFi meshes) and Femtocell (a bridge between 3G and 4G with wire line gateway access). As it becomes expensive to use 3G and 4G services, users will have a strong economic incentive to utilize free services or other alternative low cost solutions whenever possible, including the possibility of joining community resource sharing groups that allow users to provide free WiFi access to others in the community in exchange for his/her free access away from home (e.g. FON). This trend drives the connected vehicle architecture to one of opportunistic offloading of communication traffic from 3G and 4G links to free WiFi links, possibly via multiple hops.

Secondly, as more vehicles are connected in the future, social applications for drivers and passengers will become more prevalent. Already, such applications (e.g. traffic alert, speed trap knowledge sharing, etc.) are gaining popularity on smart phone devices. These applications tend to be strongly location dependent and are relevant to clusters of vehicles in close proximity. For local data traffic that is delay tolerant, it is more reasonable to utilize multihop vehicular links from both network resource utilization and cost perspectives.

For example, to illustrate the need for sending topology maintenance traffic over roadside infrastructure channels, consider the following example of a line network of N vehicles. For every vehicle to have a complete picture of the network topology, a total of $$2\sum_{i=0}^{N-1} i = N(N-1)$$

packets need to be transmitted between vehicles. This is on the order of $O(N^2)$. However, if roadside infrastructure channels are used to exchange topology information, each node sends one packet to a roadside infrastructure station. The station then broadcasts every vehicle's location on the downlink. In the worst case, a total of 2N packets is transmitted which is on the order of O(N). Furthermore, this simple example does not take into consideration the amount of time and resources a multihop network needs to spend contending for the wireless channel. Such realistic consideration would make topology maintenance using the multihop network even less appealing.

Furthermore, it is becoming common for vehicular telematics applications to rely on frequent GPS coordinate updates to a database in the Internet (e.g. Google Street View). In these cases, topology information for the network essentially comes free with no overhead through the infrastructure network.

In a similar vein, acknowledgment data (ACKs) are critical control messages that determine if the message is delivered successfully and whether retransmission is necessary. Each lost or delayed ACK may cause excess and unnecessary retransmissions. For this reason, we propose that ACKs take the infrastructure path for large number of hops where "large" is determined by the tolerable probability of ACK loss. Consider an ACK that needs to take m hops to reach the sender. The probability of loss on each hop is assumed to be identical and independent of the other hops. If $P_{loss}=Pr$(ACK is lost), and if p is the probability of ACK loss on a link, then $$P_{loss} = p\sum_{i=0}^{m-1}(1-p)^i = 1-(1-p)^m.$$

According to this relationship, the ACK loss probability increases rapidly as the number of hops increase. These few examples provided above illustrate the need for communications management that takes into account the various strengths and weaknesses of the various communications channels.

Optimized communications would be ineffective in the presence of interference. As OBUs continue to provide critical communication capabilities for in-vehicle passengers and devices, the wireless communication channels present an attack surface for people with malicious intents. For example, communication channels may be jammed by radios transmitting in overlapping frequencies at a high power nearby, rendering the wireless channel useless. The jammer may be a roadside device or a vehicle jamming all vehicles in its vicinity. Since OBUs may have a myriad of both internal and external communication links, any or all of these links may be jammed.

In addition to intentional jammers, network mis-configuration and lack of coordination may also result in unintentional interferers producing significant and persistent interference to nearby vehicles. Such sources of interference may include radio devices mounted on streetlights, traffic lights, other roadside units, and vehicles. Thus, successful communications management disclosed herein includes a solution to mitigate interference, whether the interference is intentional or incidental.

Power management is especially important in the area of electric vehicles. As electric cars become more pervasive, it is foreseeable that the electric cars will become an integral part of the smart grid infrastructure as consumers of electricity and possibly as dynamic and mobile energy storage and distribution elements. Given the powerful communication, computation, and in-vehicle integration of an OBU, it is capable of interacting with machine devices and smart grid infrastructure elements to fulfill advanced electricity charging, billing, and smart grid participation functions.

Several advantages can be achieved through these functions. The OBU can gain access to dynamic and real-time charging station loading, pricing, and road traffic information for optimized charging point decision making and navigation. In addition, the OBU can offer centralized policy control for electricity usage and optimization across all in-vehicle energy usage needs. The OBU could further provide functionality to automate billing of the charging transaction once a driving profile, billing, and preference information are established. In one embodiment, the billing could be integrated with existing bills, such as an electricity bill or a cellphone bill. Lastly, reliable communications methods disclosed herein could facilitate the dynamic storage and distribution of electricity with future wireless charging capabilities.

Without adequate power to run the communications framework in vehicle 4, communications would be non-existent. Thus far, all devices that have been put in vehicles have been simple, energy efficient devices that can be easily powered for days or even months without significantly discharging the vehicle's battery. An example of such a device is the power locking system that is always powered on to receive signals (user inputs like lock/unlock) from the key FOB.

The paradigm shift of in vehicular networking can rely on a multi-purpose and versatile OBU that is equipped with multiple radio interfaces and has significant processing power. Even with highly integrated chipsets, energy efficient microcontrollers, I/O devices and multi-layer board designs, the power consumption of a device that meets these requirements will be several orders of magnitude more than devices present in existing cars.

In some cases, the OBU and other in-vehicle devices will be turned ON and in active operation while the vehicle itself is turned off or the engine is off. Without active battery recharging from the vehicle, these devices will continue to drain the vehicle's battery. To ensure critical services such as power locking, re-ignition, and safety/security mechanisms will have access to adequate amount of power, judicious vehicle energy management is needed.

Furthermore, power management solutions should take into consideration the different power states of the connected vehicle. Electric vehicles can be broadly considered to be in one of two power states: engine-on and engine-off. Power management scenarios during these two power states are uniquely different because of the different systems and/or applications that are being utilized.

Given the complexity of the various systems in a connected vehicle, including but not limited to communications systems and power systems, and the potential for malfunctioning and exposure to malicious attacks from remote nodes, there is a need for detecting and reacting, as early as possible, to anomalies in the operation of the connected vehicle, as well as anomalies relating to the pattern of traffic transmitted to and from the connected vehicle.

Communication and interactions may be used across many end-points (e.g., machine devices, in-vehicle mobile devices, etc.) in a connected vehicle. For example, an electronic stability control system may need to collect information from individual wheels, accelerometers, throttle position, and steering angle. These machine devices may communicate with each other over buses or other appropriate architecture, using either wired or wireless technologies.

Anomaly detection compares a profile of all allowed application behavior to actual behavior as determined from the detected traffic. With a single sample size of one user in one vehicle, one difficulty is finding the range of allowed application behavior. By aggregating application behavior over time, and possibly including results from other users of other vehicles or other nearby vehicles, anomaly detection becomes a more reliable solution. Any deviation from the profile can trigger an appropriate action (e.g., sending an alert message to the vehicle console, taking action to stop the anomaly, etc.).

In accordance with one example implementation, communication system 10 can resolve the aforementioned issues relating to applications management. Specifically, communication system 10 can utilize a fully integrated OBU to manage communications applications and power systems applications of a connected vehicle, such as vehicle 4. Even more specifically, an integrated on-board unit (OBU) 30 is configured for managing the communication of data from vehicle 4 by identifying a type of data, a destination of the data, and a delay tolerance of the data. Data can be identified according to any currently existing or later developed means. In one example, a data type or delay tolerance can be identified based upon the origin of the data, the content of the data, or metadata accompanying the data. Once identified, the data may then be sent over appropriate communications channels within networks 40 based upon data transmission characteristics that are incorporated into a data transmission policy configured for optimized data transmission. Thus, communications from vehicular platforms may be sent in a cost-effective, reliable, and timely fashion. Networks 40 may facilitate communication via wireless interfaces (e.g., WiFi, WiMax, 3G, 4G, white space, 802.11x, satellite, Bluetooth, LTE, GSM/WCDMA/HSPA, CDMA1x/EVDO, DSRC, CAN, GPS etc.). Networks 40 may also facilitate communication via physical ports (e.g., Ethernet, USB, HDMI, etc.), and the like.

In addition, OBU 30 may optimize power management of vehicle 4 by processing real-time data and managing vehicular systems in accordance with a power management policy. The real-time data may be gathered from sensors 14a-b and controls 16a-c, and/or from remote sources accessible over networks 40. For example, a power state and battery level of vehicle 4 may be determined. Appropriate measures may then be taken, such as for example, and without limitation, notifying user 2 of a need for recharging, navigating user 2 to a charging station, initiating a charging transaction if vehicle 4 is docked at a charging station, or restricting the allocation of power to selected vehicular applications and/or devices.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Furthermore, it should be appreciated by one skilled in the art that the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

Turning to the infrastructure of FIG. 1, OBU 30 is configured to perform the applications management activities as disclosed herein. With regard to communications management, OBU 30 can manage data passing through communication system 10 via some network, and such communication may be initiated automatically by a vehicle system, such as vehicle diagnostics 19, or by user 2 through any suitable device, inclusive of an in-vehicle mobile device 18a or 18b, display 28, and navigation system 17. In one embodiment, additional displays may be provided for one or more passengers in vehicle 4. In-vehicle mobile devices 18a-b are inclusive of mobile phones, smart mobile phones (smartphones), e-book readers, tablets, iPads, personal digital assistants (PDAs), laptops or electronic notebooks, portable navigation systems, multimedia gadgets (e.g., cameras, players, etc.), and any other device, component, element, or object capable of initiating voice, audio, video, media, or data exchanges within communication system 10. Data, as used herein in this specification, refers to any type of numeric, voice, video, or script data, or any type of source or object code, or any other suitable information in any appropriate format that may be communicated from one point to another in electronic devices and/or networks.

In-vehicle mobile devices 18a-b, and mobile devices external to vehicle 4, may communicate with OBU 30 of communication system 10 through any wired or wireless communication link and may be configured as a personal area network (PAN) or a wireless personal area network (WPAN) or any other appropriate architecture or system that facilitates communications in a network environment. Wired and wireless communication links may be inclusive of any electronic link such as Bluetooth, Near field communication, wireless technologies (e.g., IEEE 802.11x), a USB cable, an HDMI cable, etc. Connection between mobile devices and OBU 30 may be configured based on particular needs and logistics. In one particular example, an external mobile device may be connected to OBU 30 through a USB cable or wireless network when, for example, the external mobile device is a diagnostic tool used by a mechanic for servicing vehicle 4.

Networks 40 represent a series of points or nodes of interconnected communication paths for receiving and transmitting packets of information that propagate through communication system 10. Networks 40 offer communicative interfaces between any of the components of FIG. 1 and local and/or remote network nodes and other electronic devices, and may be any local area network (LAN), wireless local area network (WLAN), wide area network (WAN), wireless wide area network (WWAN), metropolitan area network (MAN), wireless metropolitan area network (WMAN), wireless single hop or multihop vehicle-to-vehicle network, virtual private network (VPN), Intranet, Extranet, or any other appropriate architecture or system that facilitates communications in a network environment. Networks 40 may include any suitable communication link to OBU 30 such as wireless technologies (e.g., IEEE 802.11x), satellite, cellular technologies (e.g., 3G, 4G, etc.), etc., or any combination thereof. Networks 40 may also include configurations capable of transmission control protocol/Internet protocol (TCP/IP) communications, user datagram protocol/IP (UDP/IP), or any other suitable protocol, where appropriate and based on particular needs.

Embodiments of OBU 30 may include one or more distinct interfaces, represented by network interfaces 26, to facilitate communication via the various networks described herein. Such network interfaces 26 may be inclusive of multiple wireless interfaces (e.g., WiFi, WiMax, 3G, 4G, white space, 802.11x, satellite, Bluetooth, Near field communication, LTE, GSM/WCDMA/HSPA, CDMA1x/EVDO, DSRC, CAN, GPS etc.). Other interfaces represented by network interfaces 26, may include physical ports (e.g., Ethernet, USB, HDMI, etc.), and the like. Similarly, each of the network elements and user equipment (e.g., mobile devices) of communication system 10 can also include suitable interfaces for receiving, transmitting, and/or otherwise communicating data or information in a network environment.

Power management within vehicle 4 can be achieved by monitoring a power state, battery level, and the electricity consumption throughout the various systems and machine devices of vehicle 4. Monitoring may be performed by vehicle diagnostics 19 and associated sensors 14a-c, and the results may be referenced by OBU 30 for managing power allocation in vehicle 4.

OBU 30 can include one or more memory elements (e.g., memory element 24) for storing information to be used in achieving operations associated with applications management, as outlined herein. For example, a power management policy, data transfer policy, or user preferences may be stored in memory element 24 for optimizing applications management in vehicle 4. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory or storage items discussed herein should be construed as being encompassed within the broad term 'memory element' as used herein in this Specification.

In example embodiments, the operations for managing communications and power systems outlined herein may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements (e.g., memory element 24) can store data used for the operations described herein. This includes the memory elements being able to store software, logic, code, or processor instructions that are executed to carry out the activities described in this Specification.

Additionally, OBU 30 may include processing elements 21, including computing processor 22 and routing processor 23, that can execute software or algorithms to perform the activities to enable applications management and to route packets, using suitable routing protocols, associated with the applications management. A processor can execute any type of instructions associated with the data to achieve the operations detailed herein in this Specification. In one example, the processors (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described in this Specification should be construed as being encompassed within the broad term 'processor.'

Regarding a physical implementation of OBU 30, any suitable permutation may be applied based on particular needs and requirements, including the design of the particular vehicle in which OBU 30 is implemented. In example implementations, various components of OBU 30 may be installed in different physical areas of the vehicle or may be installed as single unit, with display 28 being positioned to allow driver access. Other displays may be provided in suitable locations for access by passengers in particular passenger seats. In one implementation, multimedia, networking, and communication components may be positioned at some distance from the vehicle engine (e.g., in or near the rear or trunk area if the engine is in the front area of the vehicle).

Communication system 10 may be configured to facilitate communication with machine devices (e.g., vehicle sensors, instruments, electronic control units (ECUs), embedded devices, actuators, etc.). OBU 30 may be implemented to provide one or more suitable communication interfaces (e.g., network interfaces 26) to legacy subsystems in vehicles such as, for example, a controller area network (CAN) a low speed network (LIN), a flexray communications protocol network, media oriented systems transport (MOST), and the like. Typically, multiple ECUs, with different embedded software, may be found in a single automobile and may communicate via the subsystems, such as a CAN bus. Sensors 14a-b may represent, for example, wheel and headlight sensors, respectively. Controls 16a-b may be inclusive of any embedded system or ECU that controls one or more of the electrical systems or subsystems in vehicle 4. Actuator 13 represents a vehicle-setting device such as, for example, a seat positioning device for adjusting various seat positions (e.g., longitudinal position relative to the brake and gas pedals, tilt position, lumbar support, etc.). Actuator 13 and other similar vehicle setting devices (e.g., temperature controls, sunroof, door locks, power windows, etc.) may be configured for communications in a LIN bus, in one embodiment. Sensor 14c represents a type of sensor or device that may be configured for communications via flexray communications protocol (e.g., a radar collision sensor). Control 16c, representing one or more ECUs, may be suitably integrated for controlling the flexray network and sensors and other associated components. Additionally, OBU 30 may be implemented to provide one or more suitable communication interfaces (e.g., network interfaces 26) to an Internet Protocol (IP) network, user datagram protocol (UDP) network, or any other suitable protocol or communication architecture provided to enable network communication with machine devices in vehicle 4.

In this particular example, vehicle 4 includes capabilities associated with navigation system 17 and vehicle diagnostics 19. Navigation system 17 may be provided in various embodiments including, for example, a portable navigation system or, alternatively, a fixed navigation system, each of which may be configured for wireless or wired communications to OBU 30. Other more specific machine devices, not shown in FIG. 1, may include display panel instruments, climate controls, interior lights, door locks, trunk open/shut actuator, hood open/shut actuator, seat heater and/or cooler, sunroof open/shut actuator, window heater/defroster/defogger, entertainment systems (e.g., speakers, radio, DVD, CD, etc.), and the like.

Figure 2:
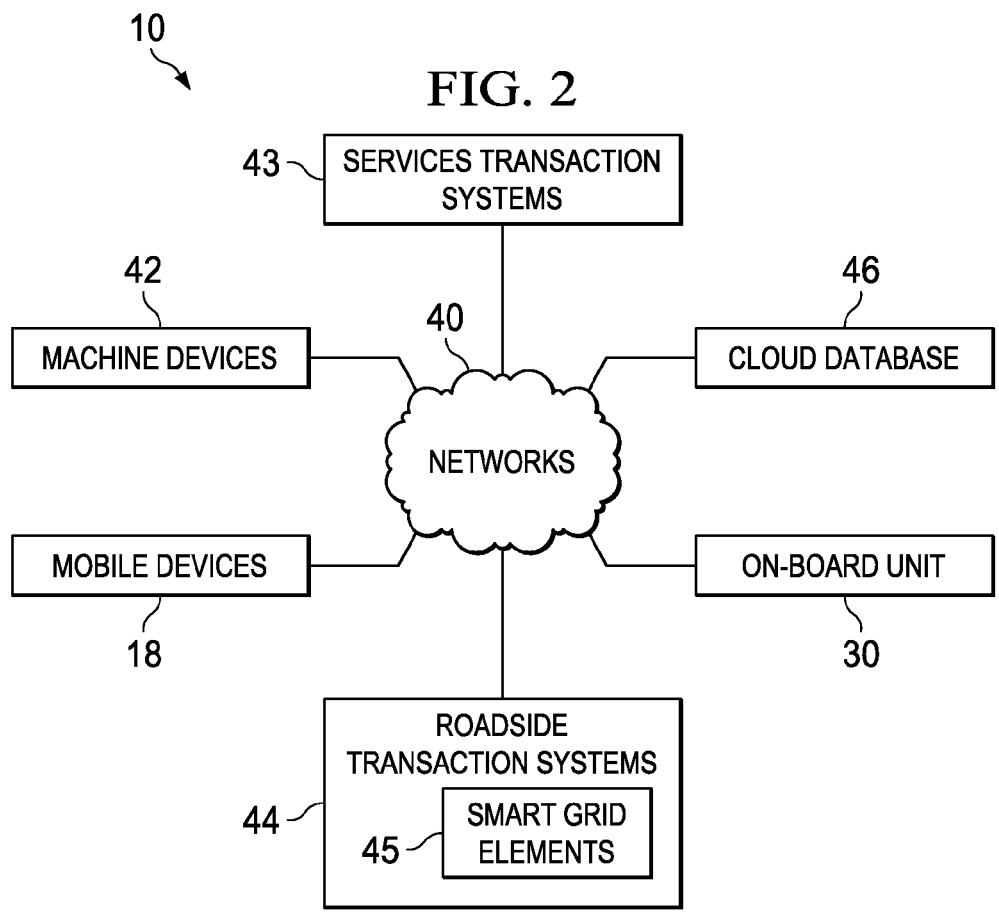
FIG. 2 is a simplified schematic diagram of the communication system in exemplary network environments associated with embodiments the present disclosure.

Turning to FIG. 2, communication system 10 is illustrated with OBU 30 shown coupled to networks 40. Networks 40 provides communications pathways to mobile devices 18, machine devices 42, services transaction systems 43, roadside transaction systems 44, and cloud database 46.

Networks 40 enable the transmission of data to and from vehicle 4 from remote network nodes, as well as the transmission of data from local nodes within vehicle 4. For example, OBU 30 may be accessible to mobile devices 18 in vehicle 4 using networks 40. Similarly, OBU 30 may access or be accessed by machine devices 42 in vehicle 4 using networks 40. In many instances, the network node will be remotely located from OBU 30 and, therefore, accessible from OBU 30 through networks 40 such as the Internet or other WANs and any available communication link (e.g., 3G, 4G, local wireless, etc.) providing network access from OBU 30 to the Internet or other WAN.

Networks 40 may also enable access to services transaction systems 43 and roadside transaction systems 44 on network nodes or other electronic devices. Each of the transaction systems can be associated with many different types of entities and many different transaction scenarios. For example, services transaction systems 43 can encompass numerous entities providing services such as mobile wireless service providers, banks and other financial institutions, location-based services (LBS), travel agencies, vehicle rental and leasing agencies, Internet websites, etc. Roadside transaction systems 44 may include various entities providing roadside services such as gas and electric charging stations, kiosks (both roadside and drive-through), etc. Roadside transaction systems 44 may include one or more smart grid elements 45 for providing a wired or wireless connection between vehicle 4 and an electrical grid to enable a charging or discharging transaction.

The transaction systems 43 and 44, as categorized, are provided for purposes of illustration and ease of understanding, and it will be appreciated that certain entities may logically be included in multiple transaction systems and that numerous types of transaction systems and entities other than those enumerated herein may also be possible.

In some instances, applications management in vehicle 4 by OBU 30 can rely on access to real-time data that may be stored in cloud database 46 and accessed by OBU 30. For example, with regard to communications management, cloud database 46 may store real-time data in the form of interference reports that are uploaded to cloud database 46 by other vehicles 59 and possibly aggregated, which can provide useful information relating to communications interferences in the vicinity of vehicle 4. Data contained within the interference reports may enable OBU 30 to mitigate the effects of the interference, thereby maintaining communications capabilities. Additionally, cloud database 46 may also store real-time data relating to charging stations and traffic conditions, which may be used by OBU 30 for power management in vehicle 4. Charging station data and traffic conditions may be uploaded to cloud database 46 by other vehicles 59, or by elements of roadside transaction systems 44. In another exemplary embodiment, operational data collected by machine devices 42 of vehicle 4 may be uploaded to cloud database 46 for creating and/or refining behavioral models and threat models that may facilitate anomaly detection in vehicle 4. In either event, whether data is being uploaded to cloud database 46 or downloaded from cloud database 46, networks 40 provides the communicative pathways to enable data transfer.

In accordance with example embodiments disclosed herein, communications to remote nodes through networks 40 can be optimized by differentiating the various wireless interfaces of vehicle 4 accessible to OBU 30, and identifying selected characteristics of data being transmitted over networks 40. Data may then be selectively transmitted through a particular wireless interface based upon relative strengths and weaknesses in relation to the different types of data and their requirements (e.g., high throughput, low latency, urgency, etc.).

In general, an on-board unit (OBU) can have access to different types of wireless interfaces. A first type of wireless interface is a hub interface for communicating with intra-vehicle devices, machine devices, roadside user devices within a coverage region, and other devices that connect to the OBU directly for the purpose of using the OBU as a gateway (e.g. Bluetooth or WiFi access point in vehicle). A second type of wireless interface is a roadside infrastructure interface for communicating with roadside infrastructure elements (e.g. 3G, 4G, and WiFi to roadside access points). Roadside infrastructure can be further differentiated as being either free (e.g., WiFi) or non-free (e.g., 3G and 4G). A third type of wireless interface is a peer interface for communicating with other OBUs and devices of other vehicles 59. Peer interfaces can be used to perform direct and multihop vehicular-to-vehicular communication. The OBU may also have wireless interfaces to communicate with machine devices.

Peer communications channels are free and have a high rate of transfer, but result in frequent disconnections and topology maintenance may consume a lot of radio resources. Similarly, free roadside infrastructure channels have no associated costs, and have a high rate of transfer, but are limited in range and result in spotty coverage. Non-free roadside infrastructure channels have wide and continuous coverage, but may be less desirable because service providers are increasingly moving towards tiered pricing and such infrastructure channels may potentially have a lower transfer rate than other free links. Given the strength and shortcomings of each type of external facing, wireless interface, properly identifying the type of data communicated across each of the specific wireless interfaces of OBU 30 enables the optimization of data transfer over networks 40 for communications management. A more detailed explanation of communications management will follow in FIG. 4 and FIGS. 8-10.

Thus, an available network represented by networks 40, may provide a communicative pathway between vehicle 4 and a local or remote node, such as other vehicles 59, where vehicle 4 includes OBU 30 and other vehicles 59 include a suitable communication device (e.g., mobile device, OBU or similar device). The communicative pathway between vehicle 4 and other vehicles 59 could be established as a single hop or multi-hop vehicle-to-vehicle (peer communications) network or through roadside infrastructure channels, such as through WiFi, WiMax, or any other suitable wireless technologies allowing a sustained connection between vehicle 4 and other vehicles 59.

Figure 3:
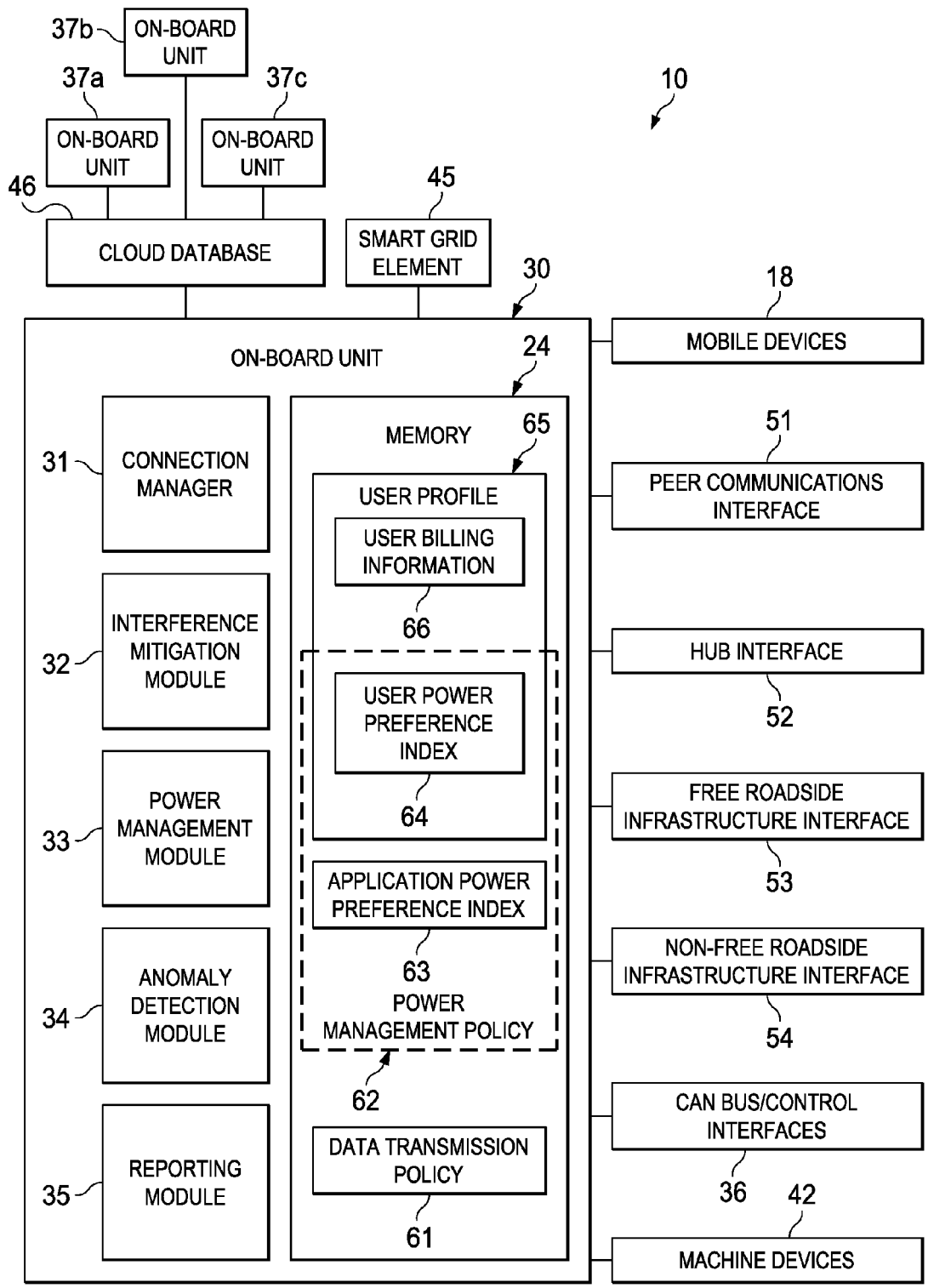
FIG. 3 is another simplified schematic diagram of the communication system in exemplary network environments associated with embodiments of the present disclosure.

Turning to FIG. 3, communication system 10 provides a more detailed representation of certain elements of OBU 30 for applications management. Communications system 10 includes OBU 30, which includes connection manager 31, interference mitigation module 32, power management module 33, anomaly detection module 34, and reporting module 35. Using one or more wireless interfaces, including peer communications interface 51, free roadside infrastructure (RSI) interface 53, non-free RSI interface 54, and hub interface 52, and control interfaces, such as CAN bus/control interfaces 36. CAN bus/control interfaces 36 can include appropriate interfaces to a CAN bus and other bus subsystems, or any other appropriate interfaces (e.g., Ethernet) for enabling communication with machine devices of the vehicle. OBU 30 can interact with various elements of communications system 10, including but not limited to cloud database 46, and smart grid element 45, machine devices 42, and mobile devices 18. Furthermore, because applications management solutions can be improved by sharing information from other sources, communication system 10 also facilitates access to information from other vehicles, which can be shared in cloud database 46 at the direction of their respective OBUs 37a-c.

Applications management according to illustrative embodiments disclosed herein proceed according to one or more related application management policies. In particular, communication management activities are governed by connection manager 31 with reference to data transmission policy 61, and by power management module 33 with reference to power management policy 62 for performing power management activities.

Connection manager 31 may coordinate the usage of all communication interfaces (mobile devices 18, peer communications interface 51, hub interface 52, free RSI interface 53, non-free RSI interface 54, CAN bus/control interfaces 36, and machine devices 42) on OBU 30. In one illustrative embodiment, there may be a dedicated communication interface that wirelessly connects (e.g. Bluetooth, Zigbee, WiFi, etc.) to smart grid element 45 at a charging station, charging outlet, or wireless charging plate. The connection allows OBU 30 to authenticate and provide user billing information 66, thereby gaining access to electricity to charge a vehicle. Smart grid element 45 reports to a billing authority the amount of electricity charged and the price so that the item can be included in the electricity usage bill of a driver. Similarly, a vehicle may participate in smart grid energy storage and distribution via wireless communication exchange with a smart grid element. In a different illustrative embodiment, the IP address of smart grid element 45 is known a priori and OBU 30 can connect to smart grid element 45 through any wireless interface via the Internet.

Data transmission policy 61 provides rules, tables, formulas, or other guidelines for managing communications. For example, data transmission policy 61 may include a hash map for associating certain wireless communications interfaces with data having identified characteristics (e.g., type, destination, delay tolerance, etc.). Data transmission policy 61 may also specify a detection deadline that dictates when OBU 30 should (re)initiate data transfer over a different communications channel because a preferred channel is unavailable. Data transmission policy 61 may also specify an acknowledgment deadline that is used to determine when data should be retransmitted over alternate communications channels because the requisite acknowledgment has not been timely returned.

Power management policy 62 provides rules, tables, formulas, or other guidelines for managing power allocation. For example, power management policy 62 may specify an operational threshold for vehicles in the engine-on power state. If the battery level falls below the operational threshold, then power management policy 62 may provide a list of actions to perform, such as alerting user 2 to a low battery status, identify an acceptable charging station, and navigate user 2 to the charging station. Power management policy 62 may also specify a reserve threshold for vehicles in the engine-off power state. Once the battery level falls below the reserve threshold, then certain power conservation activities may be initiated, as specified by power management policy 62. For example, power may be allocated to critical applications, and remaining power may be allocated to non-critical applications based upon a predetermined priority. Furthermore, these non-critical applications may be turned off in order of prioritization based on the availability of battery power. Power management policy 62 may also include generic rules for reduced power operations that modify application and device behavior based upon a power state and existing battery level. For example, reduced power operations may include dimming intra-vehicle light sources, changing communications channels from one that uses more electricity to one that uses less electricity, reducing sensor sampling, etc.

Furthermore, because power management may vary based upon different vehicle types and user preferences, power management policy 62 also takes into consideration application power preference index 63 and user power preference index 64, which provide prioritized lists of applications to receive power in the event of reduced power operations. Application power preference index 63 may be provided by a vehicle manufacturer, and user power preference index 64 may be specified by a user while configuring user profile 65. Additionally, power management policy 62 also identifies which index takes priority. For example, the user may have set safety controls low on user power preference index 64. However, power management policy 62 knows that safety controls may not be able to be set below a threshold indicated in application power preference index 63 or a manufacturer setting. Power management policy 62 may identify which index or parts of an index override the other index in situations using different policies.

In one embodiment, user profile 65 may be an identity profile including credentials and profile information for a user or other agent of the vehicle. Credentials can contain information that uniquely identifies an agent (e.g., a personal identifier (PID)) and that may be used for authentication purposes. Examples of credentials may include one or more of name, address, phone number, driver's license number, social security number, business license number, IP address, user ID/password, biometrics, personal device identifier (e.g., authentication information corresponding to key fob, access card, credit card, mobile phone, etc.), security keys, and certificates (e.g., public key infrastructure (PKI) certificate, trusted third party (TTP) certificate, etc.).

Profile information aggregates account information, preferences, and/or settings. For example, profile information can include vehicle settings, dashboard preferences, wireless interface preferences (e.g., VSIM information, WiFi account information, etc.), web account information (e.g., multimedia, social networking, etc.), mobile device list (e.g., smartphones, mobile phones, tablets, laptops, etc.) including network configurations for mobile devices, network service provider membership account information, insurance information, credit card/payment account information, billing address, manufacturer web account information, network interface account information, GPS favorite locations, and phone contact list. In addition to agents, a profile identity may be provisioned for a vehicle itself including information to distinctly identify the vehicle (e.g., a vehicle identification number (VIN)). It will be apparent that the examples provided herein of credentials and profile information are not all-inclusive, and any other suitable information or data could be included as credentials or profile information.

In some embodiments, user profile 65 may include user billing information 66, which facilitates the auto-billing of a charging transaction, such as credit/payment information. Credit/payment information may be included in an identity profile to allow the owner of the user profile to use personal credit/payment information for various charges/payments incurred during a charging transaction. Credit/payment information may also include a unique billing ID and account information in the event that unified electricity usage billing is employed. Credit/payment information may also include virtual currency, coupons, and carbon exhaust credits. A charging transaction may also be bundled with other bills, such as a cellphone bill, in which case the particular account information could be stored in the user profile 65.

To prevent unauthorized access, user profile 65 may be password protected. User profile 65 may be accessed and modified using any number of user interfaces, such as, for example, onboard touch screen, keyboard, and voice command, synchronization with mobile devices, or web database access.

Interference mitigation module 32 is an OBU component that detects interferences and if possible, mitigates the effects. In one example, interference mitigation module 32 detects interferences by monitoring channel statistics (e.g., RSSI, SNR, bit error rate, etc.) to detect evidence of interference. Additionally, interference mitigation module 32 can detect interferences by receiving interference reports or other alerts warning of the existence of communications interference. The interference reports and/or alerts may be accessed from cloud database 46 or transmitted to vehicle 4 from one or more connected vehicles as directed by one or more of the set of OBUs 37*a-c*. In either event, after the interference has been detected, interference mitigation module 32 takes steps to lessen the effects of the interference.

Anomaly detection module 34 analyzes the data passing through vehicle-specific interconnects from one endpoint to another in order to generate and refine data models describing normal operational behavior as well as behavioral anomalies. Normal operational behavior may encompass behavior that is expected from a particular vehicle, as well as behavior that is specific as to a particular user. Data models from vehicle 4 may be aggregated with data models generated from other vehicles for identifying a broader spectrum of anomalies and normal behavior.

Reporting module 35 is a component of OBU 30 that is responsible for generating and transmitting various reports, such as an interference report or an anomaly report.

Figure 4:
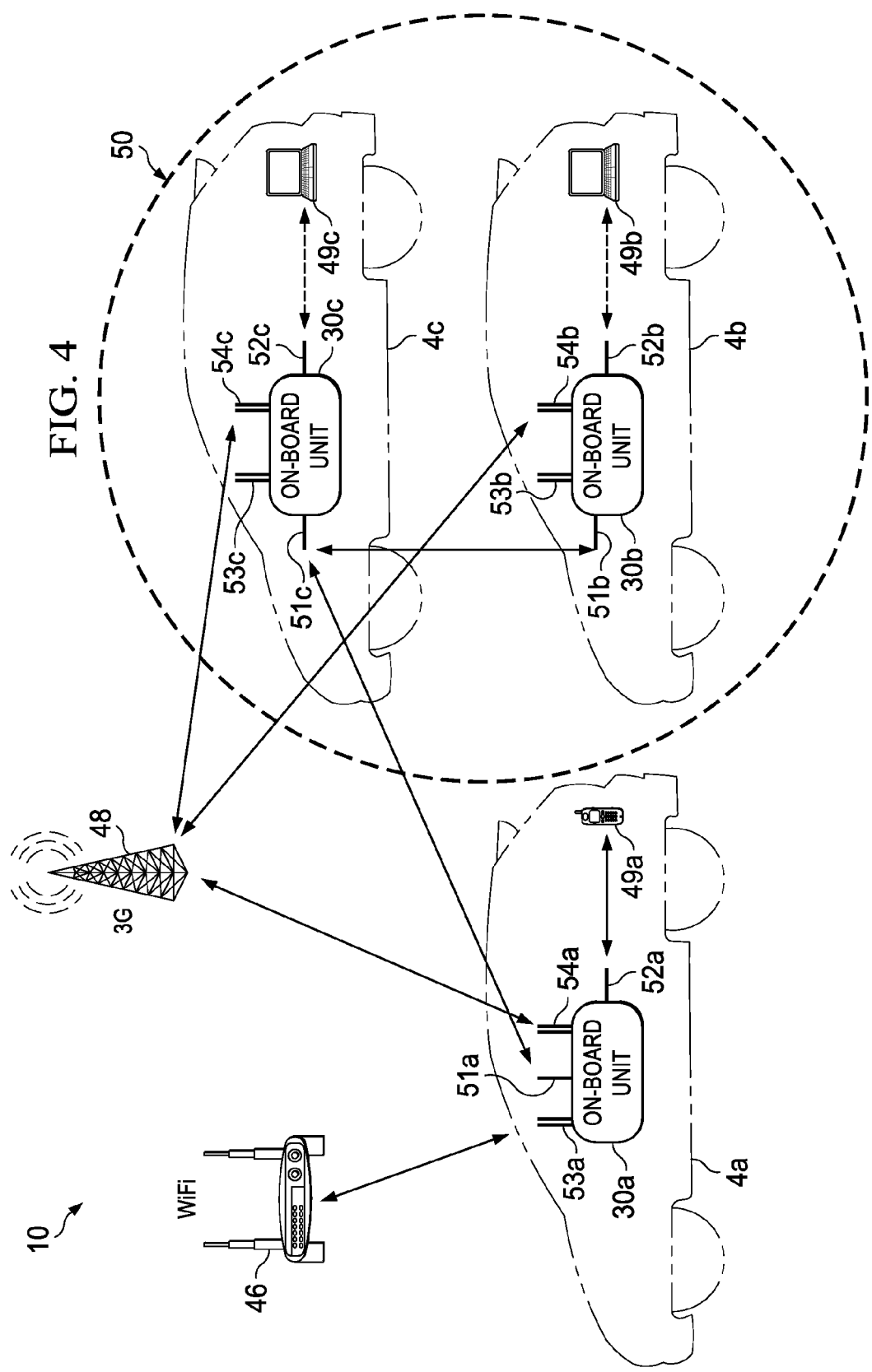
FIG. 4 is yet another simplified schematic diagram of the communication system in exemplary network environments associated with embodiments of the present disclosure.

With reference now to FIG. 4, a simplified schematic diagram of communications system 10 in an exemplary network environment associated with embodiments of the present disclosure is shown. Communications system 10 is populated by vehicles 4*a*, 4*b*, and 4*c*, each having its own OBU 30*a*, 30*b*, and 30*c*, respectively. In addition, communications system 10 includes roadside infrastructure elements WiFi access point 46 and 3G communications tower 48. Communications system 10 also includes mobile devices 49*a-c* that are shown with network access over hub communications channels.

OBUs 30*a-c* direct communications over networks 40 through at least one of four wireless interfaces: peer communications interface (51*a-c*), hub interface (52*a-c*), free RSI interface (53*a-c*), and non-free RSI interface (54*a-c*). Managing communications for optimized transmission to remote nodes from vehicle 4 involves identifying a type of data (e.g. data traffic, control traffic), a destination of the data (e.g., vehicle to vehicle, vehicle to other destinations), and a delay tolerance of the data (e.g., delay tolerant traffic, delay sensitive traffic). The identified data may then be sent through a preferred wireless interface given the strengths and weaknesses of the available interfaces, as previously described. These strengths and weaknesses are accounted for in data transmission policy 61, which specifies thresholds and other parameters for managing communications.

In one or more illustrative embodiments, the different types of interfaces may be managed in a manner indicated by the table below:

| | Road-side Infrastructure | | |
|---|---|---|---|
| | Non-free | Free | Peer |
| | Data Traffic | | |
| | Vehicle to Vehicle in Local Network | | |
| Delay Tolerant | | | Preferred |
| Delay Sensitive | Switch to infrastructure if close to delay deadline or ACK has not returned beyond a time threshold or destination node no longer in local network. | | Preferred |
| | Vehicle to Other Destinations | | |
| Delay Tolerant | | Prefer multihop to free road-side infrastructure if available | |
| Delay Sensitive | | Prefer multihop to free road-side infrastructure if available | |
| | Switch to infrastructure if close to delay deadline or ACK has not returned beyond a time threshold. | | |
| | Control Traffic for Vehicle-to-Vehicle Communication | | |
| Topology Maintenance | | Preferred | |
| ACKs | | Preferred for large number of hops | Preferred for small number of hops |

As mentioned earlier, transfer of control data between vehicles 4a-c over networks 40 consumes relatively large amounts of resources when sent over a peer communications network, so the optimized transmission of control data is over roadside infrastructure channels via free RSI interface 53a-c and non-free RSI interface 54a-c. In a preferred embodiment, topology maintenance data is transmitted over non-free RSI interfaces 54a-c, as are ACKs that need more hops than a hop threshold, as defined by data transmission policy 61. ACKs that can be transmitted below the hop threshold may be sent over peer communications channels.

Although data transmission policy 61 indicates that data traffic is preferably transmitted over peer communications channels, in some scenarios data traffic may be resent over RSI channels. Specifically, data traffic that is urgent and thus not delay tolerant may be resent over RSI channels if a peer communications channel is not available by the expiration of a delay threshold after the request to transmit data has been received. The length of the delay threshold can be defined in data transmission policy 61. In addition, data traffic that has been initially sent over peer communications channels may be resent over RSI channels in the event that the corresponding ACK has not been received from the destination node within a time threshold (which can also be specified by data transmission policy 61).

Consider the scenario where vehicle 4b is attempting to send data traffic to vehicle 4c. Since vehicles 4b and 4c are both within local network 50, then the communication would be sent from peer communications interface 51b to peer communications interface 51c. A local network for a particular vehicle at an instance in time includes other vehicles that the particular vehicle can reach, possibly via multiple hops. If the data traffic is delay tolerant, then no follow up action is required. However, if the data traffic was not delay tolerant, and if delivery could not be achieved over peer communications channels, or if the ACK was not received by vehicle 4b from vehicle 4c, then the data traffic is resent over RSI channels. In this illustrative example in FIG. 4, since vehicles 4b and 4c lack access to free RSI channels, the data traffic is resent via non-free RSI interface 54b and received by vehicle 4c from 3G tower 48.

Data traffic could also be sent from vehicle 4b to vehicle 4a over peer communications channels, using multihop delivery with vehicle 4c as the intermediary. As previously discussed, the data traffic may be resent over available RSI channels if needed. In the event that an ACK should be returned to vehicle 4b from vehicle 4c, data transmission policy 61 may be consulted to determine whether the number of hops from vehicle 4a back to vehicle 4b is below the hop threshold. Depending upon the hop threshold, the ACK may either be returned via multihop mechanisms over peer communications channels, or through RSI channels.

Figure 5:
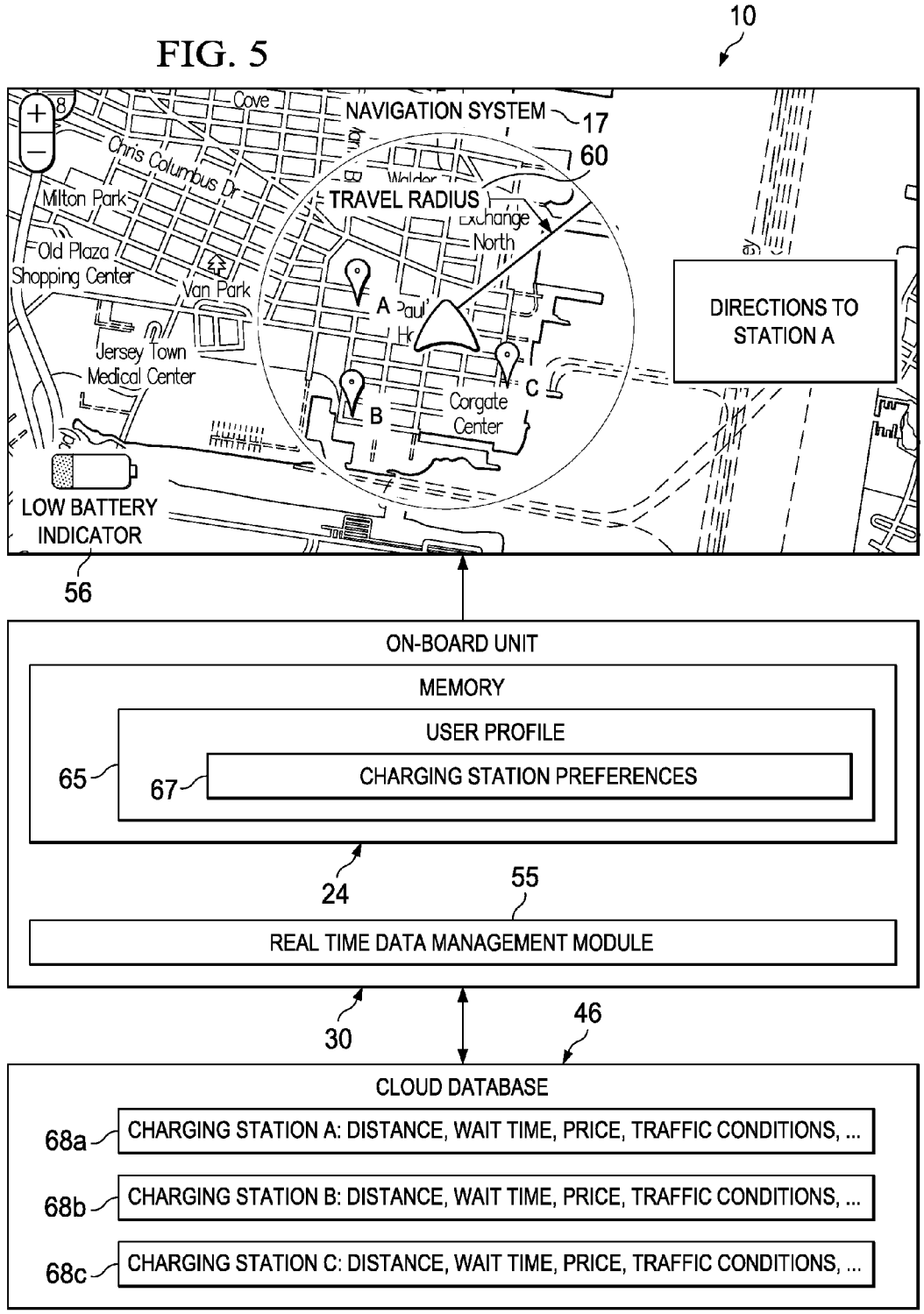
FIG. 5 is a block diagram of a power management scenario associated with embodiments of the present disclosure.

With reference now to FIG. 5, communication system 10 is depicted which provides a more detailed representation of certain elements of OBU 30 for power management of vehicle 4 in an engine-on power state. Power management in vehicle 4 is achieved by power management module 33, in conjunction with real-time data management module 55, and with reference to power management policy 62. User 2 may participate in power management activities (e.g., providing user preferences) by interacting with a suitable user interface, such as navigation system 17.

Power management module 33 interfaces with the CAN bus/control interfaces 36 to determine a power state of vehicle 4 and battery level. If vehicle 4 is in the engine-on power state, and the battery level dips below an operational threshold, an alert is generated. The alert may trigger power management activities defined in power management policy 62. Additionally, the alert may also be presented to user 2 on a display, such as low battery indicator 56 on navigation system 17. The operational threshold and the form of the alert can be specified in power management policy 62 or can be preconfigured default policies.

In an exemplary embodiment, one effect of the low battery alert is the selection of and navigation to a charging station. The selection of the charging station can be made in accordance with selection criteria specified by a user when creating user profile 65. Users may specify a wide range of policies in user profile 65 such as charge duration, preferred charging stations, remaining battery alert, and a price of electricity. A user may also choose whether to participate in smart grid electricity storage and distribution.

Charging station selection criteria are specified by user 2 in charging station preferences 67. Charging station preferences 67 may include any number of criteria for enabling the selection of charging stations by power management module 33. The selection criteria may include, for example and without limitation, a distance from vehicle 4, a wait time at the charging station, a price of electricity offered at the charging station, number of vehicle docking stations present, availability of restrooms, traffic conditions on roadways between vehicle 4 and the charging station, or any other relevant criteria which enables user 2 to select a charging station from a list of available charging stations.

Because the charging station selection criteria can be based, in part, upon variable conditions, OBU 30 also includes real-time data management module 55 for receiving and processing real-time charging station data 68*a-c*, which may be stored in cloud database 46. Real-time data management module 55 calculates travel radius 60 based upon an amount of available electricity, taking into account traffic conditions in the vicinity of vehicle 4. Charging stations within travel radius 60 are identified, and charging station preferences 67 are applied to select a list of acceptable charging stations. In one example embodiment, the list of selected stations is presented to user 2 for selecting a charging station. In another example embodiment, the choice is made by power management module 33. In either instance, directions to the selected charging station may be presented on navigation system 17 for guiding user 2 to the proper location.

In one implementation, charging stations may periodically send updated, real-time data such as current wait time and current price of electricity to cloud database 46. Vehicles in close geographical proximity may query cloud database 46, determine the optimal charging station in reference to the selection criteria stored within user profile 65, and navigate the vehicle to the chosen charging station. In another implementation, current wait time and price information may be exchanged between vehicles, possibly via multiple hops. Additional information such as real-time road traffic condition can further optimize the charging station selection and navigation decision.

When the vehicle is in the engine-off power state, power management module 33 continues to monitor and support electronics that are in operation. In particular, power management module 33 can start and stop the charging process if vehicle 4 is docked at a smart grid element (e.g. at a parking lot, in a garage, or at a charging station). For example, if the vehicle cannot perform a recharging transaction, power management module 33 can manage power by allocating power to critical applications according to power management policy 62.

To enable power management in the engine-off power state, applications are defined as being either critical applications or non-critical applications. To further refine the power management in an engine-off vehicle, non-critical applications may be further differentiated as user-experience applications or communications applications. Critical applications are features that are given the highest priority for receiving sufficient power to operate whenever activated. For example, operation applications such as power locking and anti-theft modules may be powered ON at all times. Similarly, when entering a vehicle, the interior lights may be ON for safety reasons. Selected communications applications may also be characterized as critical applications. For example, RFID readers should be able to communicate with RFID tags embedded in a car fob to enable a user to unlock the car doors, activate a panic alarm, or start a vehicle configured with keyless ignition.

To ensure sufficient power is available for critical applications, a reserve threshold is set that triggers predefined power conservation activities. For example, if the battery level is below the reserve threshold, then power is allocated only to critical applications and all non-critical applications remain unpowered. In the event that there is insufficient power for all critical applications, power may be allocated to selected applications based upon a level of priority specified in application power preference index 63. If, however, the power level is above the reserve threshold, then power can be allocated to remaining non-critical applications according to power management policy 62.

By classifying non-critical applications as user-experience applications and communications applications, power management policy 62 may further optimize power management in vehicle 4. For example, user-experience applications are non-critical features that are allocated battery power based on an availability of power. These applications are further prioritized based on user preferences as indicated in user power preference index 64. For some user-applications, a power conservation policy may reduce the sampling rate to reduce energy consumption.

Power allocation to communications applications is prioritized based upon known power consumption characteristics and channel conditions. For example, WiFi may be switched off in favor of 3G communications interfaces, which use less power. Similarly, certain communications modules may be turned off. Accordingly, transmitters may be turned off, and receivers (which may be characterized as a critical application) may be left on. Power conservation for communications applications can utilize other power conservation steps, such as reducing a communications rate (graceful QoS degradation), or putting devices/interfaces in power-saving mode (e.g., reduced sensor duty cycles, power saving mode for WiFi devices, etc.). Finally, current usage may also be a factor in prioritizing communication applications. For example, if battery levels are low and a user is currently running an application with data intensive traffic (e.g., downloading video, etc.) then the traffic may be switched to the most efficient energy option available (e.g., multihop instead of direct transmission to an access point or base station).

Figure 6:
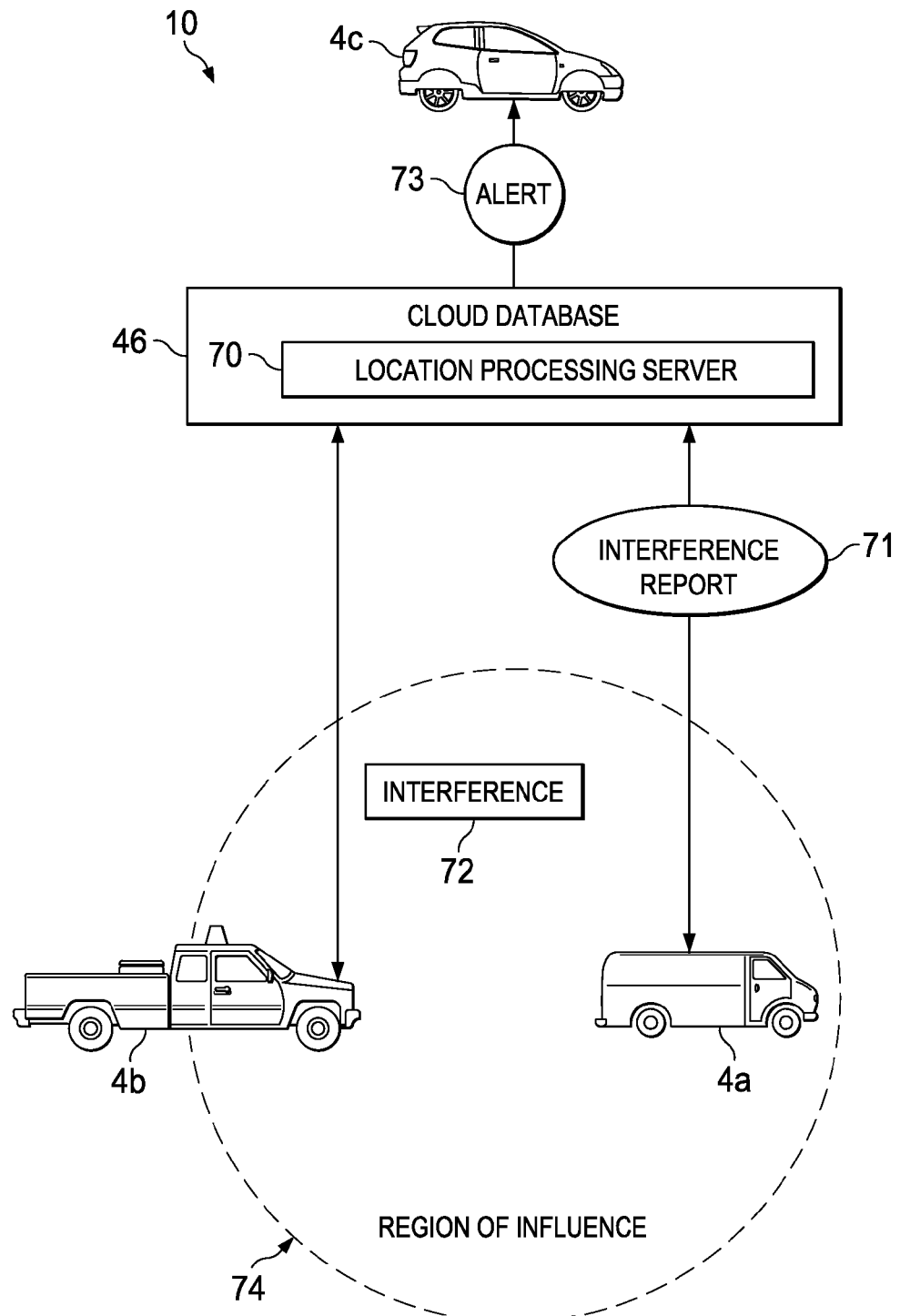
FIG. 6 is a schematic diagram of a communications scenario in exemplary network environments associated with embodiments of the present disclosure.

Turning to FIG. 6, communications system 10 is depicted which provides a more detailed representation of interference mitigation. Communications system 10 enables vehicles 4*a-c* to communicate with each other and with cloud database 46 though networks 40 (not shown) using either roadside infrastructure channels or peer communications channels, depending upon characteristics of the data communications. Cloud database 46 includes location processing server 70 that aggregates interference reports 71 for locating interference 72. Once sufficient data has been collected from the submitted interference reports, alerts 73 may be transmitted which help localize interference 72 and determine region of influence 74. Such information may help vehicles mitigate the effects of interference 72.

Interference 72 may be incidental interference or malicious, unauthorized jamming of communications signals. Interference 72 may be detected by the interference mitigation module of an OBU. For example, during normal operation of a vehicle, an interference mitigation module of the OBU periodically monitors channel statistics (e.g., RSSI, SNR, bit error rate, etc.). Interference 72 is detected when the performance of a link drops below a pre-determined level. In some cases, average channel property may be known for known (or previously encountered) access points and base stations. Persistently low SNR or high bit error rate compared to the average may indicate abnormal amount of interference in the region. Once interference is detected, the interference mitigation module of a vehicle takes steps to mitigate the interference.

To secure critical communications from such interference, different levels of OBU-supported techniques can be implemented. First, interference may be mitigated or eliminated by utilizing antenna beam-patterning. In particular, for OBU interfaces with antenna arrays, direction of the jammer/interferer can be obtained and a null is placed in its direction using standard array processing techniques thereby eliminating or minimizing the effect of the interference. Second, for interfaces without antenna array and in case a null is not sufficient to cancel out the effects of interference, communications sessions are migrated seamlessly to other channels or interfaces. Third, the interference can be localized and nearby vehicles and/or the appropriate response agency can be alerted. Fourth, interference can be mitigated by limiting a transmission range of the OBU with dynamic power control.

A reporting module of the OBU may generate interference report 71 that facilitates detection and proactive mitigation of interference 72. In one embodiment, the reporting module receives channel statistics from the interference mitigation module. The reporting module periodically updates interference report 71 that is sent to location processing server 70. In an example embodiment, the following information is included in interference report 71: <OBU ID, Interface ID, Channel ID, AP ID, GPS coordinate, SNR>.

As vehicles drive by interference 72, each will experience a period of high interference because interference 72 has a finite region of influence 74. The combined information from multiple vehicles can yield a good estimate of the position/trajectory of interference 72. When enough information is collected at location processing server 70, the location of interference 72 can be estimated, for example, by taking the centroid of the regions with low SNR. Similarly, the location of interference 72 may be determined by calculating the intersection of the various antenna arrays, the location of interference 72 can be determined. Specifically, the intersection of all the estimated directions from different OBUs can yield a very good estimate of the position/trajectory of interference 72.

For illustration purposes, consider interference 72 that produces region of influence 74 that disrupts communications in communications system 10. Vehicle 4a was the first to enter region of influence 74 and detected interference 72 using the interference mitigation module of its OBU. Interference report 71 was generated and transmitted from vehicle 4a to location processing server 70 in cloud database 46. Vehicle 4b received an alert from location processing server 70 prior to entering region of influence 74 and initiating antenna arrays for mitigating the effects of interference 72. Concurrently, vehicle 4b is generating and updating its own interference report for transmission to location processing server 70. The additional information facilitates the locating of interference 72. Vehicle 4c has not yet entered region of influence 74; however, since the projected path of vehicle 4c is through region of influence 74, location processing server 70 transmits alert 73 to vehicle 4c, which provides information relating to interference 72. With knowledge of the upcoming interference, vehicle 4c may activate interference mitigation module 32 prior to entering the region of influence 74 by, for example, activating antenna arrays, if available, or changing the communications channel/interface to one which is unaffected by interference 72.

In another embodiment, vehicles may communicate the interference reports and/or alerts to other vehicles via multi-hop links. Such communications may be authorized and secured via a trust mechanism. Proper authority or network management entities may be alerted, by either vehicles 4a-c or location processing server 70, over either roadside infrastructure or peer communications channels, as to the location of interference 72 to remedy the problem.

Figure 7:
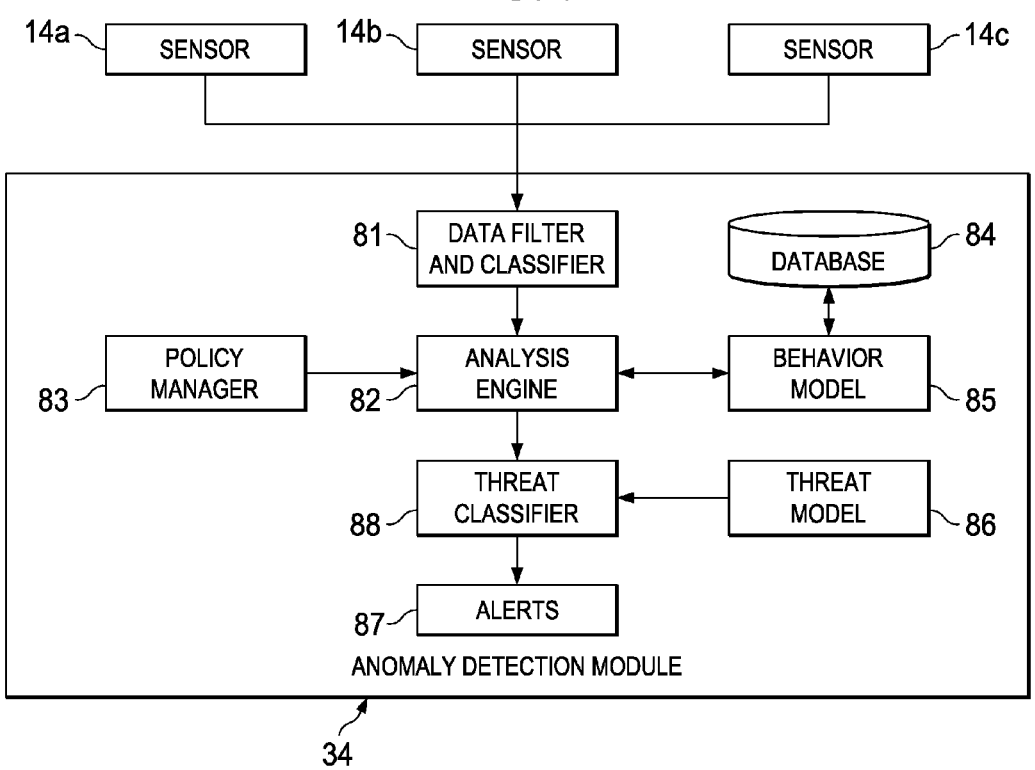
FIG. 7 is a simplified block diagram of an on-board unit (OBU) for use in exemplary network environments associated with embodiments of the present disclosure.

FIG. 7 is a block diagram presenting a more detailed illustration of the anomaly detection module of OBU 30. Anomaly detection module 34 includes data filter and classifier 81, analysis engine 82, policy manager 83, database 84, and threat classifier 88. Behavior model 85 is stored on and accessed from database 84. Threat model 86 may also be stored on and accessed from database 84. Sensors 14a-c are sensors disseminated across the various bus subsystems and/or non-bus subsystems throughout vehicle 4 that can inspect the traffic and collect data on the information being exchanged across the gateways and supergateways throughout vehicle 4. Sensors 14a-c may be implemented as part of the gateways and supergateways, or as dedicated devices connected to one of the vehicular bus subsystems. Data collected by sensors 14a-c are passed to data filter and classifier 81 for aggregation and classification. Data is then passed to analysis engine 82 for identifying anomalies. In particular, analysis engine 82 compares the data from data filter and classifier 81 against behavior model 85 with reference to policy manager 83. Policy manager 83 defines acceptable thresholds and parameters by which data can vary from behavior model 85. Behavior model 85 provides the range of "normal" operational behavior, and if the data variation is in excess of the thresholds defined by policy manager 83, then an anomaly is detected and sent to threat classifier 88 for further processing.

Threat classifier 88 processes the anomaly data received from analysis engine 82 and either creates or updates threat model 86. Threat model 86 is a data model that defines a particular anomaly. Threat model 86 may be continually updated and refined on a local OBU or uploaded to a cloud-based server for aggregating with threat models uploaded from other vehicles. The "connected" nature of the vehicle could be used to aggregate anomalies on a larger scale by creating a large database of anomalies and profiles for each vehicle model in the cloud of the vehicle manufacturer. Data collected by sensors on a given vehicle could be uploaded to the cloud, when possible, to contribute to the definition of the profile and new anomalies, policies could be dynamically downloaded to the vehicles whenever the OEM refines the profiles describing the normal behavior of a vehicle.

Such an apparatus leverages the "internet" uplink of the connected vehicle to manage and dynamically adapt the profile of anomalies and good behaviors of a vehicle and the set of policies implemented to react to new vulnerabilities as they are discovered during the entire lifetime of the vehicle.

In one embodiment, a detected anomaly may trigger a specific action. For example, threat classifier 88 may generate alerts 87 that could include, for example, a simple alert message sent to a vehicle console for receipt by end user 2 or another individual, such as a car manufacturer or mechanic. Furthermore, threat classifier 88 may initiate an action meant to stop the anomaly (such as shutting down the device or application that is responsible for the anomaly).

Turning to FIGS. 8 through 12, simplified flowcharts illustrating various aspects of embodiments of the present disclosure are shown. For ease of reference, FIGS. 8 through 12 will be described herein with reference to various elements, objects, modules, and components of the present disclosure as provided in preceding FIGS. 1 through 7.

Figure 8:
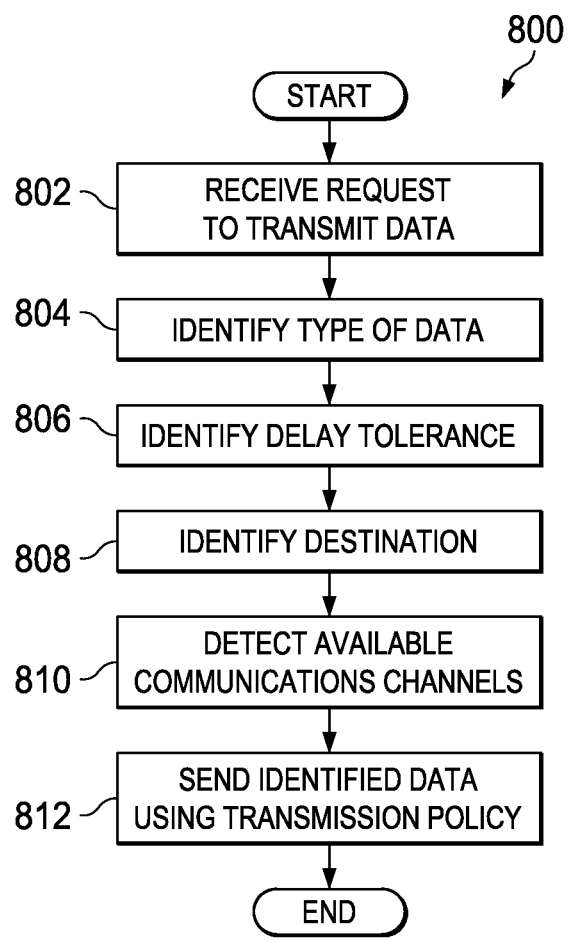
FIGS. 8-13 are simplified flowcharts associated with possible activities associated with the communication system of the present disclosure.

FIG. 8 is a high-level data transmission flow 800 providing example steps of connection manager 31 for transmitting data from vehicle 4 to a selected destination. Data transmission flow 800 begins at step 802 by detecting a request to transmit data. The request to transmit data may originate from within vehicle 4 (e.g., at the request of user 2, automatically by reporting module 35 or other software agent, by an authorized entity such as a manufacturer accessing OBU 30 from a remote location, by a mobile device accessing OBU 30, or in some instances from another vehicle in a peer communications link as in a multihop transmission scenario). Once the request to transmit data has been detected, flow passes to step 604 to identify a type of data. Data identified in step 604 may be data traffic or control traffic. Control traffic is further identified as being either topology maintenance data or acknowledgment data.

The flow continues to step 806 where a delay tolerance is identified. Flow passes on to step 808 where a destination of the data transmission is identified. Identification of the destination includes identifying both a type of destination node and a location of the destination node. For example, the destination node may be another vehicle or a non-vehicle destination, such as a cloud based server. Identification of the location of the destination node can include determining whether the destination node is in a local network, or if it is located remotely.

Flow then passes to step 810 and available communications channels are identified. Thereafter, the identified data is sent using a transmission policy in step 812, and data transmission flow 800 terminates.

Figure 9:
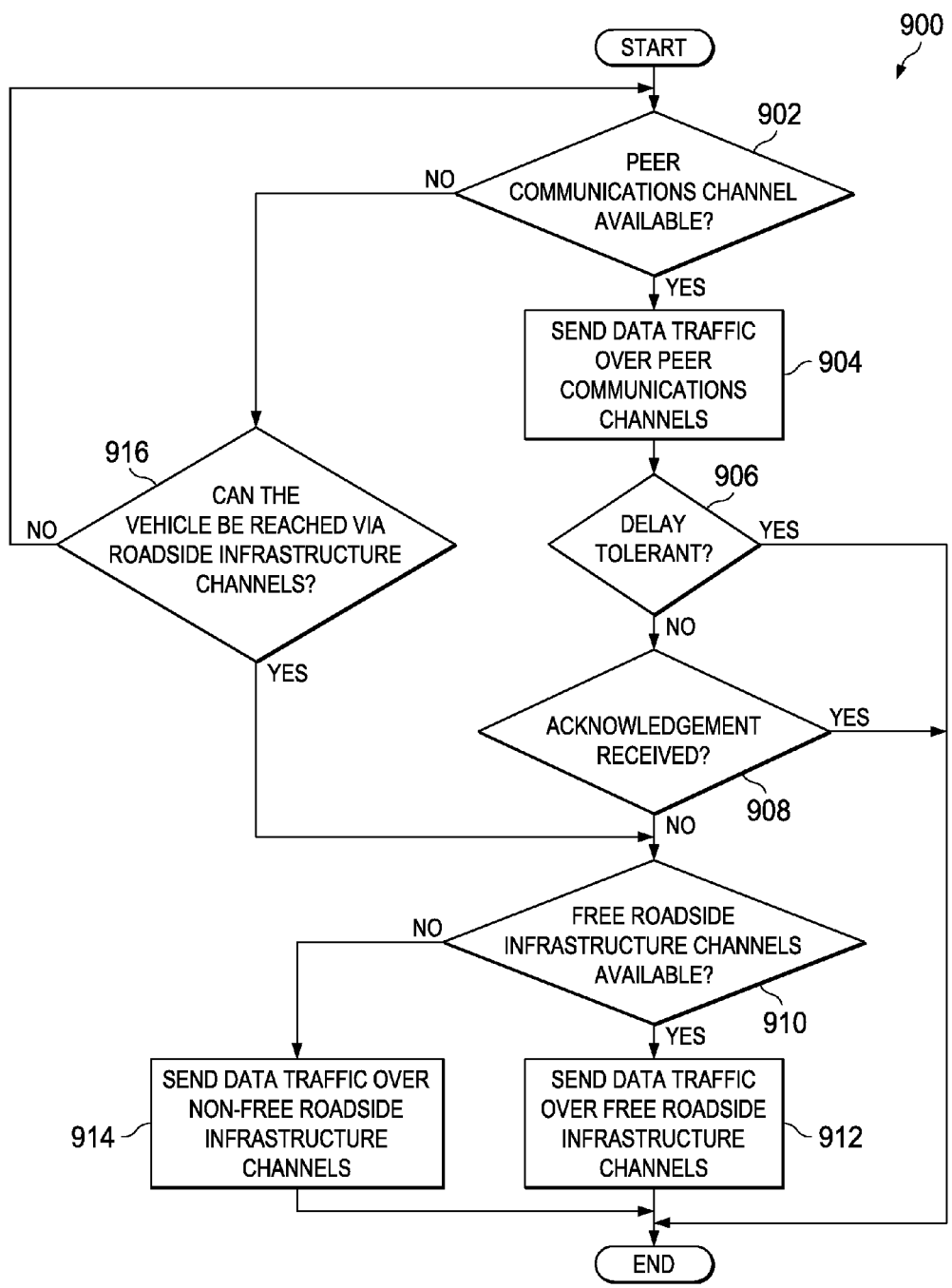

FIG. 9 is a simplified communications flow 900 providing example steps of connection manager 31 for transmitting data traffic. Communications flow 900 begins at decision block 902 where a determination is made as to whether peer communications channels are available. If peer communications channels are available, then flow passes to step 904 and the data traffic is sent over the peer communications channels. Flow passes to decision block 906 where a determination is made as to whether the data traffic is delay tolerant. If the data traffic is delay tolerant, then communications flow 900 terminates. However, if the determination is made that the data traffic is not delay tolerant, then flow passes to decision block 908 where a determination is made as to whether an acknowledgment has been received.

If at decision block 908 a determination has been made that an acknowledgment has been received, then the communications flow 900 terminates. If, however, the acknowledgment has not been received, then flow passes to decision block 910 where a determination is made as to whether free roadside infrastructure (RSI) channels are available. In different illustrative embodiments, the acknowledgements may be given a predetermined amount of time to be received before the flow passes to decision block 910. If free RSI channels are available, then flow passes to step 912 and the data traffic is resent over the free RSI channels, and communications flow 900 terminates. However, at decision block 910 the determination is made that free RSI channels are not available, then flow passes to step 914 and the data traffic is resent over non-free RSI channels. Communications flow 900 terminates thereafter.

Returning now to decision block 902, if the determination is made that peer communications channels are not available, then flow passes to decision block 916 where a determination is made as to whether the vehicle can be reached via roadside infrastructure channels. If the vehicle cannot be reached via roadside infrastructure channels, then flow returns to step 902 and communications flow 900 essentially waits for a peer communications channel to become available. However, if at decision block 916 a determination is made that the vehicle can be reached via roadside infrastructure channels, then flow passes to step 910 and the data traffic is sent over RSI channels.

Figure 10:
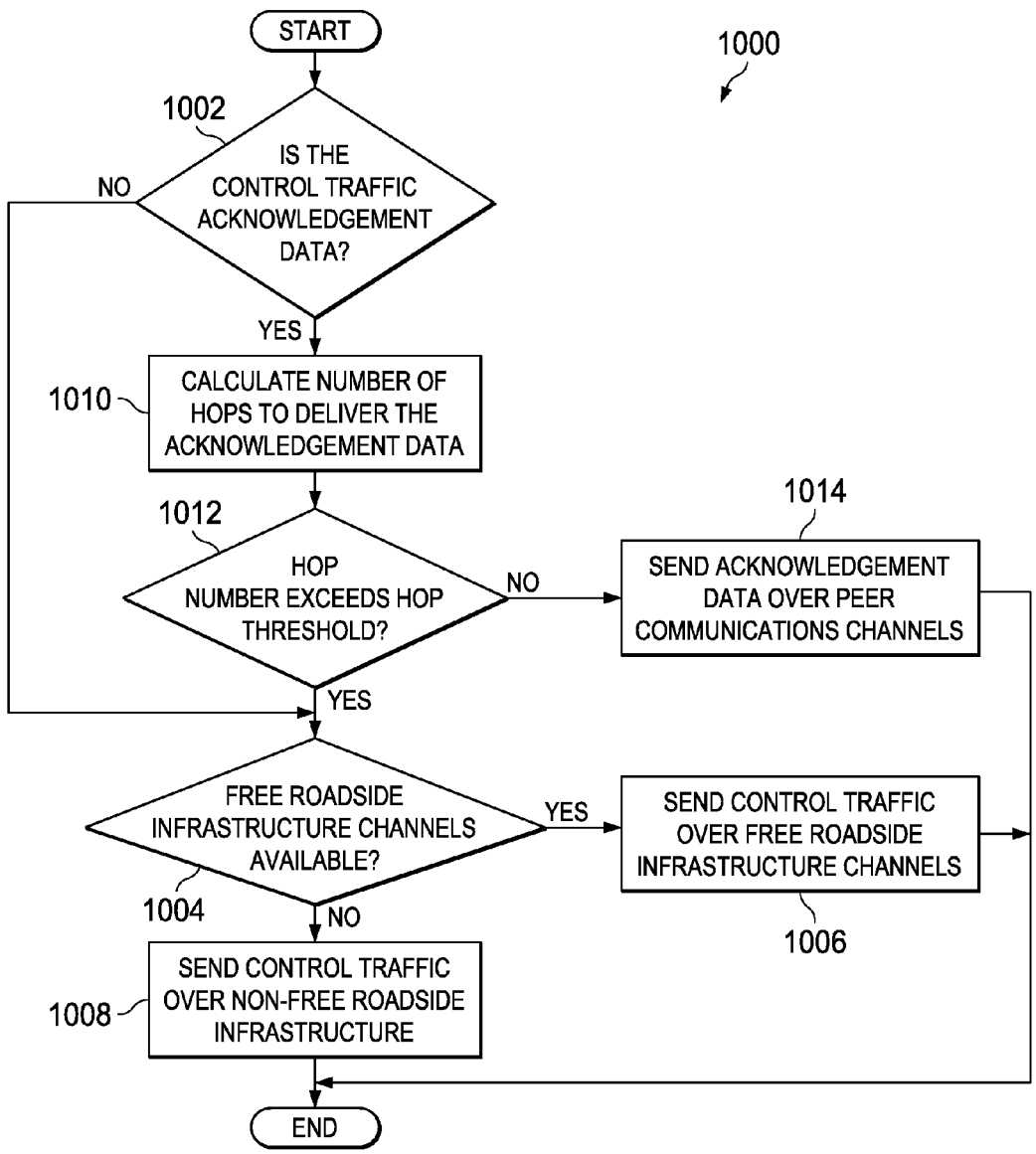

FIG. 10 is a simplified communications flow 1000 providing example steps of connection manager 31 for transmitting control traffic data. Communications flow 1000 begins at decision block 1002 where a determination is made as to whether the control traffic is acknowledgement data. If the determination is made that the control traffic is not acknowledgement data, then flow passes to decision block 1004 where another determination is made as to whether free roadside infrastructure (RSI) channels are available. If a determination is made that free RSI channels are available, then flow passes to step 1006 and the control traffic is sent over free RSI channels. Communications flow 1000 terminates thereafter. If at decision block 1004, the determination is made that free RSI channels are not available, then flow passes to step 1008 and control traffic is sent over non-free RSI channels, and the communications flow 1000 again terminates.

Returning now to decision block 1002, if the determination is made that the control traffic is acknowledgement data, then flow passes to step 1010 and the number of hops for delivering the acknowledgment data. Flow then passes to decision block 1012, where a determination is made as to whether the number of hops calculated exceeds the hop threshold. If the number of calculated hops exceeds the hop threshold, then flow passes to decision block 1004 and the acknowledgment data is sent over RSI channels. However, if at decision block 1012 a determination is made that the number of hops does not exceed the hop threshold, then flow passes to step 1014 and the acknowledgment data is sent over peer communications channels. Communications flow 1000 terminates thereafter.

Figure 11:
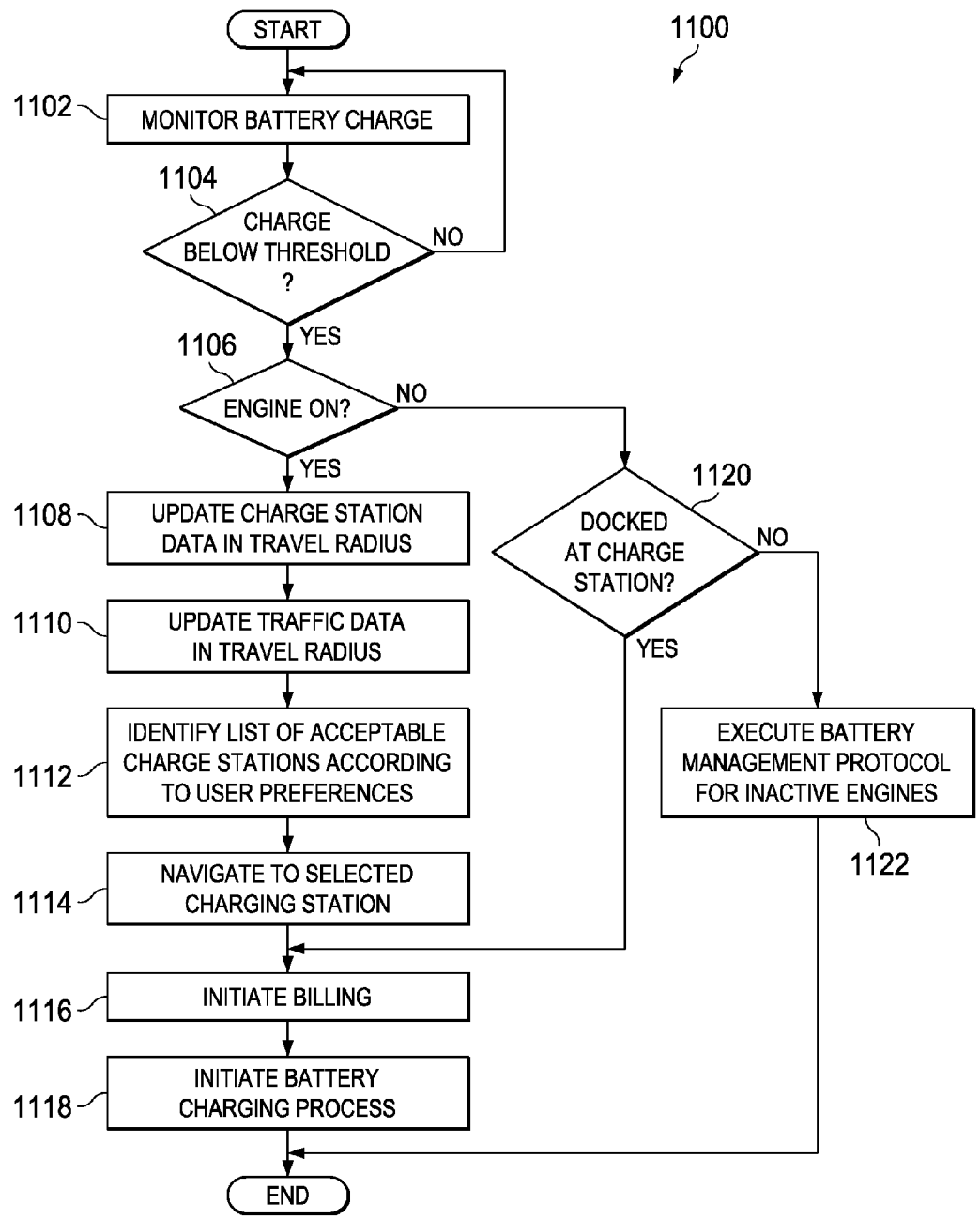

FIG. 11 is a simplified power management flow 1100 providing example steps of power management module 33. Power management flow 1100 may be initiated at vehicle startup and may be configured as a background process that runs while OBU 33 is booted up and vehicle 4 is operational.

Power management flow 1100 begins at step 1102, monitoring a battery charge. Flow passes to decision block 1104 and a determination is made as to whether the battery charge is below a threshold. If the charge is not below a threshold, then flow returns to step 1102. However, if at decision block 1104, the determination is made that the battery charge is below a threshold, then flow passes to decision block 1106 and another determination is made as to whether the engine is on. Restated, this decision block is making a determination as to the power state of vehicle 4.

If the determination is made that the engine is on (e.g., the vehicle is in the engine-on power state), then flow passes to step 1108 and charge station data in a travel radius of vehicle 4 is updated. The charge station data may be accessed directly from the various charging stations in the travel radius, or in another example embodiment, the data may be retrieved from a centralized, cloud-based server as depicted in FIG. 2.

After charge station data is updated in the travel radius, flow passes to step 1110 and traffic data is updated in the travel radius of vehicle 4. Traffic data may include any number of non-limiting factors, such as an average speed limit of vehicles on roadways, a number of traffic signals, existence of roadway construction, etc. This data may be retrieved from a cloud-based server as depicted in FIG. 2, or may be provided by other vehicles in a peer-to-peer communication mode, possibly including multi-hops.

With the updated charge station data and traffic data, flow passes to step 1112 and a list of acceptable charge stations are identified, in accordance with user preferences, from all charge stations in the travel radius of vehicle 4. Flow then passes to step 1114 and navigation is provided to a selected charging station from the list of acceptable charge stations. In one embodiment, user 2 selects the charge station from the list of acceptable charge stations.

Flow then passes to step 1116 and billing for the charging transaction is initiated. Then, power management module 33 initiates a battery charging process in step 1118, and the process terminates.

Returning to decision block 1106, if the determination is made that the engine is off (e.g., the vehicle is in the engine-off power state), then flow passes to decision block 1120 and a determination is made as to whether the vehicle is docked at a charge station. If the vehicle is docked at a charge station, then flow proceeds to step 1116 and billing is initiated. However, if the determination is made that the vehicle is not docked at a charge station, then flow passes to step 1122 and a battery management protocol is initiated for vehicles in the engine-off power state. In different illustrative embodiments, step 1118 may come before step 1116. Additionally, in other illustrative embodiments, step 1116 may come at other positions in the flow. Thereafter, flow terminates.

Figure 12:
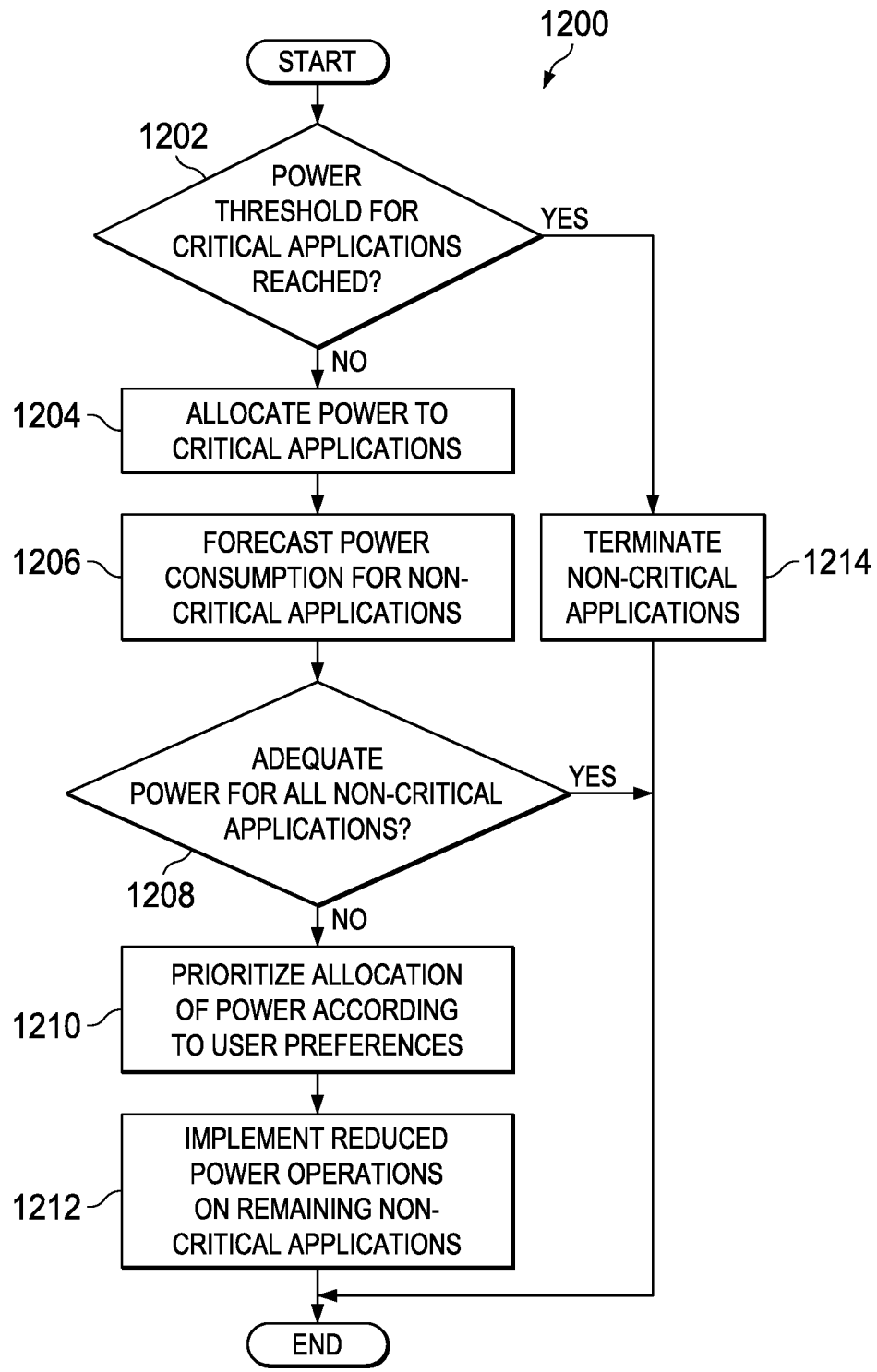

FIG. 12 is a simplified power management flow 1200 for allocating power to vehicular systems in an engine-off power state, which may occur in step 1122 of FIG. 1100. Power management flow 1200 begins at decision box 1202 where a determination is made as to whether a reserve threshold for critical applications has been reached. If the determination is made that the reserve threshold for critical applications has not been reached, then power is allocated to all critical applications in step 1204. Flow then passes to step 1206 where power consumption for non-critical applications is forecasted. If the determination is made at decision box 1208 that adequate power exists for all non-critical applications, then power management flow 1200 terminates. However, if the determination is made that power is inadequate for all non-critical applications, then flow passes to step 1210 and power is allocated according to user power preferences. Flow then passes to step 1212 where reduced power operations are implemented as to the remaining non-critical applications, and the process terminates thereafter.

With reference again to decision box 1202, if a determination is made that a power threshold for critical applications has been reached, then non-critical applications may be terminated at step 1214. Additionally, some prioritization may occur for the critical applications, if necessary.

Figure 13:
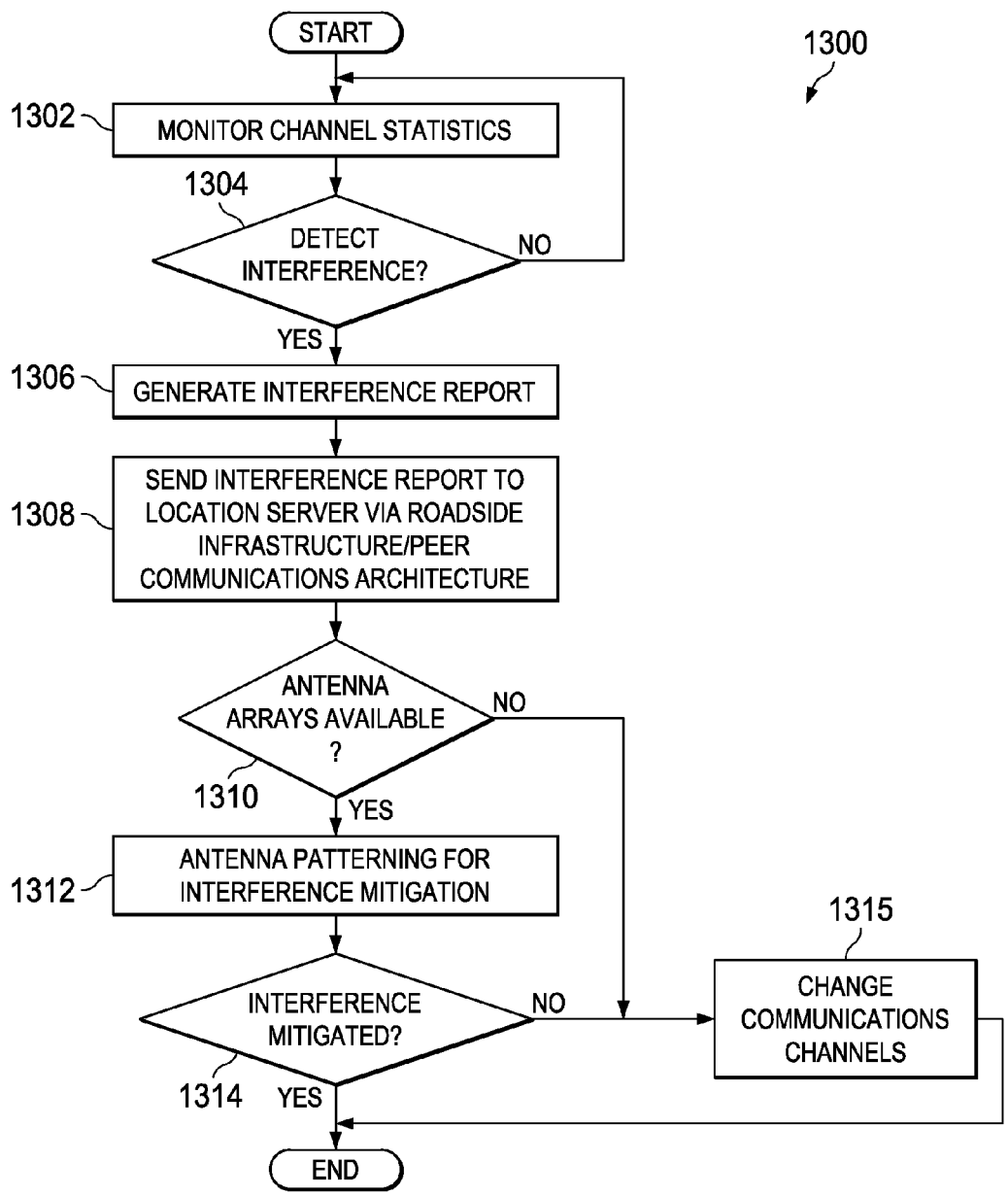

FIG. 13 is a simplified interference mitigation flow 1300 providing example steps of interference module 32 for mitigating intentional or incidental communications interference experienced by vehicle 4. Interference mitigation flow 1300 may be initiated at vehicle startup and may be configured as a background process that runs while OBU 30 is booted up and vehicle 4 is operational.

Interference mitigation flow 1300 begins at step 1302, monitoring communications channel statistics. Communications channel statistics may be monitored by OBU 30, interfacing with one or more sensors, or communications channel statistics may be provided by a remote source, such as location server 70, or another vehicle traveling in a vicinity of vehicle 4.

Flow then passes to decision box 1304 where a determination is made as to whether interference is detected. If interference is not detected, then flow returns to step 1302. However, if at decision box 1304, a determination is made that interference is detected, then flow passes to step 1306 and an interference report is generated. Once the interference report is generated, flow passes to step 1308 and the interference report is sent to location server 70 over the blended roadside infrastructure/peer communications architecture as disclosed hereinabove. Flow then passes to decision box 1310 and a decision is made as to whether antenna arrays are available in vehicle 4. If antenna arrays are available in vehicle 4, then antenna patterning takes place for interference mitigation in step 1312. In one or more illustrative embodiments, antenna patterning places nulls in the direction of the interference or interfering device. Flow then passes to decision box 1314 where a determination is made as to whether interference is mitigated by the interference-cancelling signal. If the interference has been mitigated, then interference mitigation flow 1300 ends.

Returning now to decision box 1310, if the determination was made that antenna arrays were not available in vehicle 4, then flow passes to step 1315 and a communications channel affected by the interference is changed. Then, interference mitigation flow 1300 ends. Similarly, at decision block 1314, if the determination was made that the interference was not mitigated by the interference-cancelling signal from step 1312, then flow passes on to step 1315 and the communications channel affected by the interference is changed.

In certain implementations and numerous examples provided herein, vehicle 4 is described with reference to an automobile. Communication system 10, however, is not limited to automobiles, but can be applied to a myriad of other types of vehicles (e.g., airplanes, boats, trains, etc.). It will be appreciated that the broad teachings disclosed herein are intended to include any type of vehicle used to move from one location to another location, including vehicles that are not designed to transport humans.

In certain example implementations, at least some portions of applications management in a vehicular environment, namely communications and power management activities outlined herein may be implemented in software. This could be inclusive of software provided in modules and elements of OBU 30, such as connection manager 31 and power management module 33. These elements and/or modules can cooperate with each other in order to perform the enabling of applications management in a vehicular environment, namely communications and power management activities. In other embodiments, one or more of these features may be implemented in hardware, provided external to these elements, or consolidated in any appropriate manner. For example, some of the processors associated with the various elements may be removed, or otherwise consolidated such that a single processor and a single memory location are responsible for certain activities. In a general sense, the arrangements depicted in the block diagrams and/or schematic diagrams may be more logical in their representations, whereas a physical architecture may include various permutations, combinations, and/or hybrids of these elements.

Any of the memory items discussed herein should be construed as being encompassed within the broad term 'memory element.' Similarly, any of the potential processing elements, modules, and machines described in this Specification should be construed as being encompassed within the broad term 'processor.' Furthermore, OBU 30, and each separate component of OBU 30, may also include suitable interfaces for receiving, transmitting, and/or otherwise communicating data or information in a network environment.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the foregoing diagrams may be combined in various possible configurations, all of which are clearly within the broad scope of this Specification. In certain cases, it may be easier to describe one or more of the functionalities of a given set of flows by only referencing a limited number of network elements. It should be appreciated that communication system 10 and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
 detecting, by a processor of an on-board unit of a vehicle, a request to send data to a destination node;
 identifying a type of the data and a set of available communications channels associated with the on-board unit; and
 sending the data according to a transmission policy,
  wherein if the type of the data is identified as data traffic, a delay tolerance of the data traffic is determined and the data traffic is sent using one of the available communications channels, which is determined based, at least in part, on the delay tolerance of the data traffic,
  wherein if the type of the data is identified as control traffic, a type of the control traffic is identified and the control traffic is sent using one of the available communications channels, which is determined based, at least in part, on the type of the control traffic.

2. The method of claim 1, wherein the set of available communications channels includes at least one of a peer communications channel or a roadside infrastructure channel.

3. The method of claim 2, wherein sending the data traffic using the peer communications channel comprises:
 resending the data traffic over the roadside infrastructure channel if at least one of the destination node is non-existent or a delivery threshold is exceeded.

4. The method of claim 2, wherein sending the control traffic comprises:
 sending topology maintenance data over the roadside infrastructure channel; and
 sending acknowledgment data over the peer communications channel if the acknowledgment data can be delivered within a predefined number of hops.

5. The method of claim 2, wherein sending the control traffic comprises:
 sending acknowledgment data over the roadside infrastructure channel if a number of hops exceeds a predefined number of hops.

6. The method of claim 1, further comprising:
 responsive to detecting a communications interference, generating an interference report within the data traffic;
 transmitting the interference report to a processing server; and
 mitigating effects of the communications interference.

7. The method of claim 6, wherein mitigating the effects of the communications interference comprises at least one of switching to a different communications channel, placing nulls in a direction of the communications interference, or alerting other nodes of the communications interference.

8. At least one non-transitory media that includes code for execution and when executed by a processor is operable to perform operations comprising:
 detecting a request to send data to a destination node;
 identifying a type of the data and a set of available communications channels for sending the data; and
 sending the data according to a transmission policy,
  wherein if the type of the data is identified as data traffic, a delay tolerance of the data traffic is determined and the data traffic is sent using one of the available communications channels, which is determined based, at least in part, on the delay tolerance of the data traffic, wherein if the type of the data is identified as control traffic, a type of the control traffic is identified and the control traffic is sent using one of the available communications channels, which is determined based, at least in part, on the type of the control traffic.

9. The at least one non-transitory media of claim 8, wherein the set of available communications channels includes at least one of a peer communications channel or a roadside infrastructure channel.

10. The at least one non-transitory media of claim 9, wherein sending the data traffic using the peer communications channel comprises:

resending the data traffic over the roadside infrastructure channel if at least one of the destination node is non-existent or a delivery threshold is exceeded.

11. The at least one non-transitory media of claim 9, wherein sending the control traffic comprises:

sending topology maintenance data over the roadside infrastructure channel; and sending acknowledgment data over the peer communications channel if the acknowledgment data can be delivered within a predefined number of hops.

12. The at least one non-transitory media of claim 9, wherein sending the control traffic comprises:

sending acknowledgment data over the roadside infrastructure channel if a number of hops exceeds a predefined number of hops.

13. The at least one non-transitory media of claim 8, further comprising:

responsive to detecting a communications interference, generating an interference report within the data traffic;

transmitting the interference report to a processing server; and mitigating effects of the communications interference.

14. The at least one non-transitory media of claim 13, wherein mitigating the effects of the communications interference comprises at least one of switching to a different communications channel, placing nulls in a direction of the communications interference, or alerting other nodes of the communications interference.

15. An apparatus, comprising:

a memory element configured to store information;

a processor operable to execute instructions associated with the information; and a connection manager module, the apparatus being configured to:

detect a request to send data to a destination node;

identify a type of the data and a set of available communications channels associated with the apparatus; and send the data according to a transmission policy, wherein if the type of the data is identified as data traffic, a delay tolerance of the data traffic is determined and the data traffic is sent using one of the available communications channels, which is determined based, at least in part, on the delay tolerance of the data traffic, wherein if the type of the data is identified as control traffic, a type of the control traffic is identified and the control traffic is sent using one of the available communications channels, which is determined based, at least in part, on the type of the control traffic.

16. The apparatus of claim 15, wherein the set of available communications channels includes at least one of a peer communications channel or a roadside infrastructure channel.

17. The apparatus of claim 16, wherein if the connection manager module sends the data traffic using the peer communications channel, the connection manager module is to:

resend the data traffic over the roadside infrastructure channel if at least one of the destination node is non-existent or a delivery threshold is exceeded.

18. The apparatus of claim 16, wherein the connection manager module being configured to send the control traffic is to:

send topology maintenance data over the roadside infrastructure channel; and send acknowledgment data over the peer communications channel if the acknowledgment data can be delivered within a predefined number of hops.

19. The apparatus of claim 15, further comprising:

a reporting module configured to:

responsive to detecting a communications interference, generate an interference report within the data traffic; and transmit the data traffic to a processing server; and an interference mitigation module configured to:

mitigate effects of the communications interference.

20. The apparatus of claim 15, further comprising:

an anomaly detection module configured to:

receive sensor data from a sensor associated with a data network in a vehicle;

compare the sensor data to a behavior model; and determine whether a deviation exists above a threshold within the sensor data from the behavior model.

* * * * *